United States Patent [19]

Brett et al.

[11] Patent Number: 5,309,405
[45] Date of Patent: * May 3, 1994

[54] METHODS OF EMPLOYING VIBRATIONAL ENERGY IN A BOREHOLE

[75] Inventors: James F. Brett; Joseph F. Goetz, both of Tulsa; Alan P. Roberts, Bixby, all of Okla.

[73] Assignee: Oil & Gas Consultants International Inc., Tulsa, Okla.

[*] Notice: The portion of the term of this patent subsequent to Oct. 27, 2009 has been disclaimed.

[21] Appl. No.: 967,233

[22] Filed: Oct. 26, 1992

Related U.S. Application Data

[63] Continuation-in-part of Ser. No. 885,628, May 18, 1992, Pat. No. 5,210,381, which is a continuation-in-part of Ser. No. 704,805, May 23, 1991, Pat. No. 5,159,160.

[51] Int. Cl.$^5$ ............................................. G01V 1/40
[52] U.S. Cl. ..................................... 367/36; 367/37; 367/57; 181/106; 181/113; 181/121
[58] Field of Search ................. 181/106, 113, 121; 367/36, 37, 57

[56] References Cited

U.S. PATENT DOCUMENTS

| | | | |
|---|---|---|---|
| 3,718,205 | 2/1973 | Fair et al. | 181/0.5 H |
| 4,252,189 | 2/1981 | Bodine | 166/249 |
| 4,252,210 | 2/1981 | Sodich | 181/119 |
| 4,257,482 | 3/1981 | Kompanek | 166/249 |
| 4,280,557 | 7/1981 | Bodine | 166/177 |
| 4,342,364 | 8/1982 | Bodine | 166/249 |
| 4,471,838 | 9/1984 | Bodine | 166/249 |
| 4,509,593 | 4/1985 | Traver et al. | 166/63 |
| 4,544,031 | 10/1985 | Bodine | 166/177 |
| 4,548,281 | 10/1985 | Bodine | 175/55 |
| 4,671,379 | 6/1987 | Kennedy et al. | 181/106 |
| 4,702,315 | 10/1987 | Bodine | 166/249 |
| 4,702,343 | 10/1987 | Paulsson | 181/106 |
| 4,716,555 | 12/1987 | Bodine | 367/35 |
| 4,722,417 | 2/1988 | Selsam | 181/119 |
| 4,783,771 | 11/1988 | Paulsson | 367/37 |
| 4,788,467 | 11/1988 | Plambeck | 310/323 |
| 4,805,725 | 2/1989 | Paulsson | 181/106 |
| 4,805,727 | 2/1989 | Hardee et al. | 73/151 |
| 4,815,557 | 3/1989 | Duwe | 181/106 |
| 4,817,712 | 4/1989 | Bodine | 166/249 |
| 4,954,998 | 9/1990 | Recter | 367/82 |
| 4,979,829 | 12/1990 | Allen | 366/108 |
| 4,991,685 | 2/1991 | Airhart | 181/106 |
| 5,159,160 | 10/1992 | Brett | 181/106 |
| 5,658,897 | 4/1987 | Kompanek et al. | 166/249 |

FOREIGN PATENT DOCUMENTS

| | | |
|---|---|---|
| 0325029 | 7/1989 | European Pat. Off. . |
| 0493096 | 7/1992 | European Pat. Off. . |
| 1506927 | 12/1967 | France . |

*Primary Examiner*—J. Woodrow Eldred
*Attorney, Agent, or Firm*—Head & Johnson

[57] ABSTRACT

Methods are provided for making use of an apparatus for generating vibrational energy in a borehole, the apparatus utilizes a mass and a rotary source for suspending the mass in a borehole or in casing in a borehole or in an instrument housing that may be positioned in an opened or cased borehole arranged to cause frictional contact with the surface of the rotating mass, the mass being rotatable about is rotational axis in one direction to cause it to backward whirl in the opposite direction, the centrifugal force of the whirling mass serving to generate vibrational energy that is used to obtain geophysical information as to the structure of the earth surrounding and adjacent to the borehole and for enhancing cementing and production enhancing techniques in oil or gas wells.

15 Claims, 17 Drawing Sheets

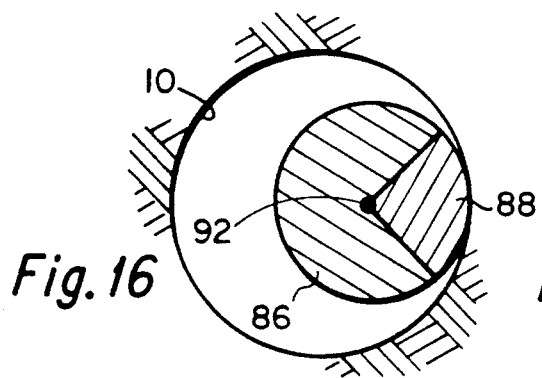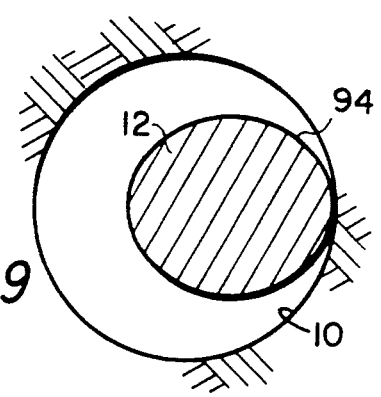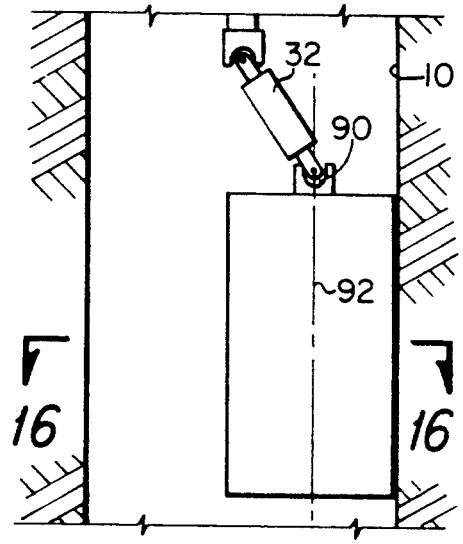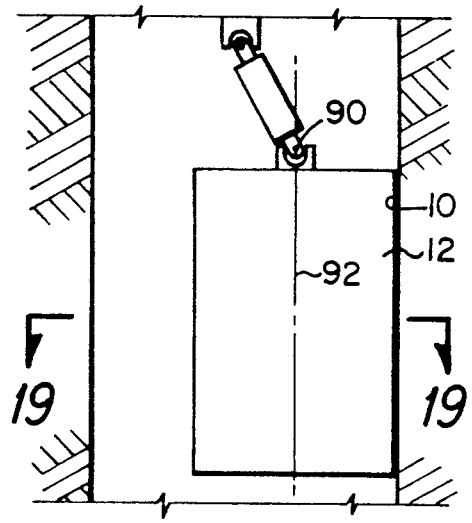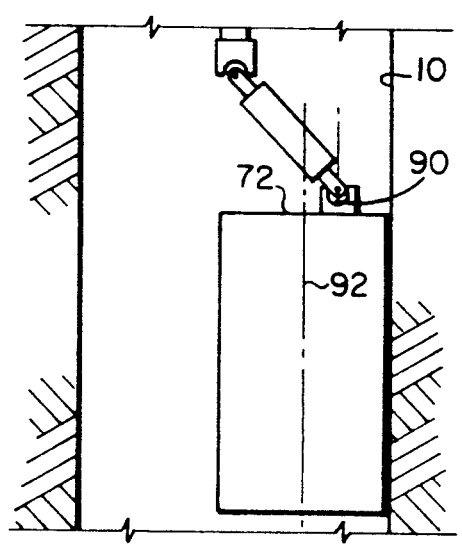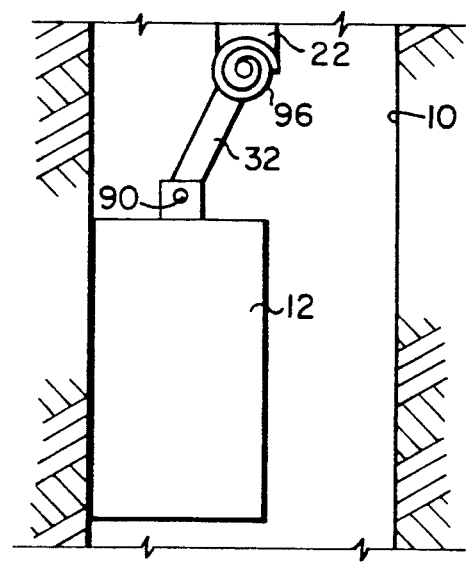

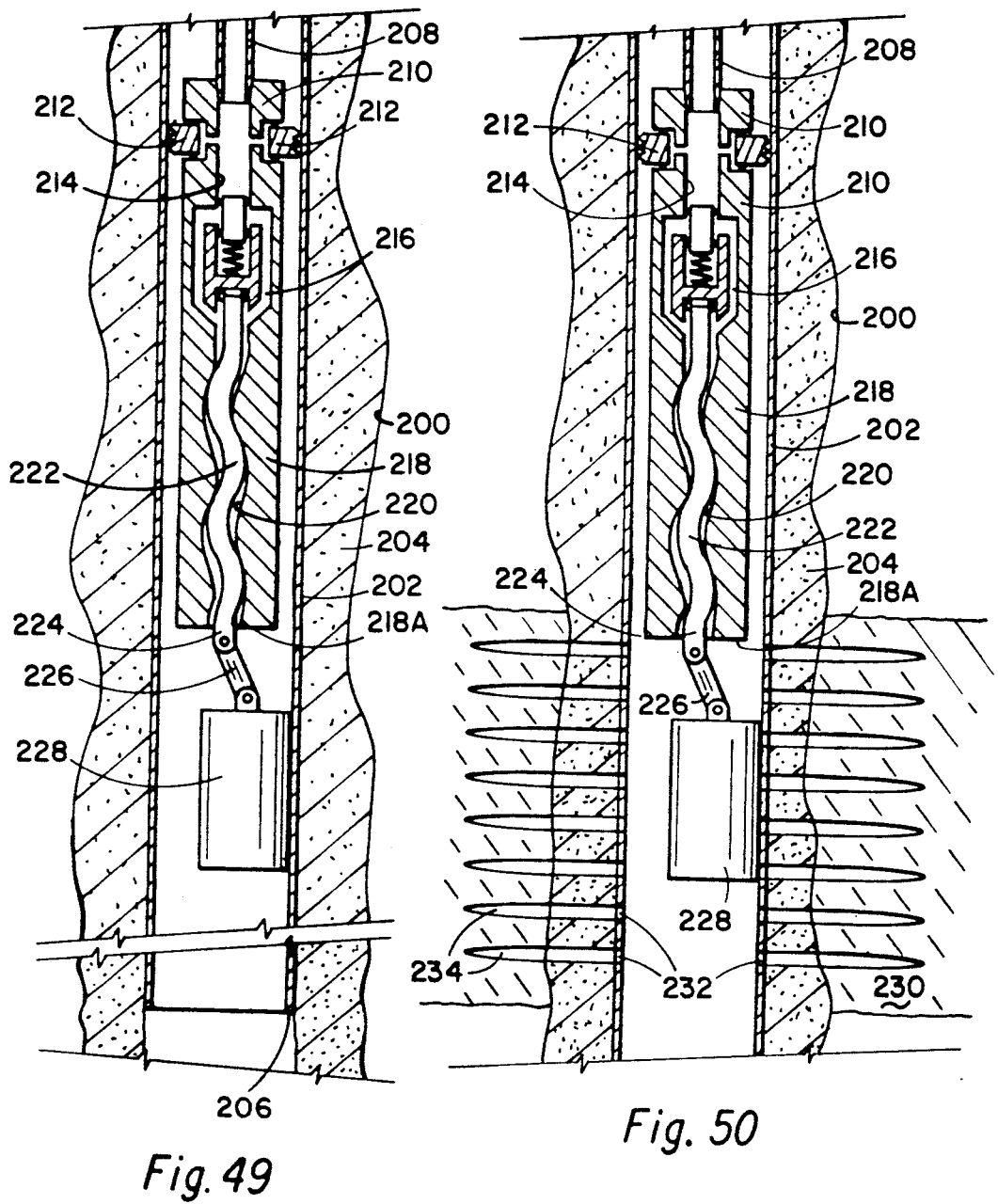

METHODS OF EMPLOYING VIBRATIONAL ENERGY IN A BOREHOLE

This is a continuation-in-part of copending application(s) Ser. No. 07/885,628 now U.S. Pat. No. 5,210,381, filed on May 18, 1992 a continuation-in-part of Ser. No. 07/704,805 now U.S. Pat. No. 5,159,160 filed on May 23, 1991.

BACKGROUND OF THE INVENTION

This disclosure provides methods of creating and using a downhole vibrational energy source in earth boreholes. In one application the vibrational energy is used as a seismic energy source for generating information as to the geology surrounding the borehole. In other applications the downhole vibrational energy source is used to augment more successful extraction of hydrocarbons from subterranean formations.

For information relating to others who have provided methods and apparatuses for generating downhole seismic energy, reference may be had to the following previously issued U.S. Pat. Nos. 3,718,205; 4,252,210; 4,671,379; 4,702,343; 4,722,417; 4,783,771; 4,796,723; 4,805,725; 4,805,727; 4,815,557; 4,834,210 and 4,856,614.

SUMMARY OF THE INVENTION

Basically, the downhole seismic energy source of this disclosure is a cylindrical mass that is caused to backward whirl about a borehole. Backward whirling motion is identical to the motion of a pinion rotating in an internal gear or that of a "spiro-graph" child's toy. One salient feature of the motion is that it creates very large centrifugal accelerations that allow a relatively small mass to create a very large force. For example, a 4.5" diameter steel mass 10' long, inside 5" ID casing will create about 24,000 pounds of sinusoidally varying force at 41.7 Hz when made to backward whirl by rotation at 250 RPM.

In the seismic energy source of this disclosure the power necessary to drive the backward whirling motion is provided by either a mechanical linkage to the surface, i.e. a string of tubing or dill pipe, or by a downhole motor, either electric, hydraulic or pneumatic. An electric motor offers the advantage of being finely speed controllable from the surface, but its power is limited by size constraints dictated by the borehole size. A hydraulic motor, on the other hand, can deliver 5 to 10 times more power per unit volume than an electric motor.

Systems required to maintain controllable rotational speed for electric or mechanical drive systems are well known in the art. A system to measure the frequency of the backward whirling seismic source used in combination with a downhole hydraulic motor is provided. To determine the position, velocity, or acceleration of the seismic source, an accelerometer can be placed on the motor near the cylindrical mass. This allows the drive frequency of the seismic source to be known through either electronic recording means downhole, or by transmission to the surface by acoustic telemetry, or via an electric conductor. This signal can then be used to control the speed of the driving motor and thus the frequency of the seismic source.

Control of a driving motor can be accomplished in a number of ways. The surface pumping rate of a positive displacement pump can be controlled to vary the pumping rate in response to the desired range of frequencies of the seismic source, which may be either constant or varying with time. A positive displacement pump can control the speed of a positive displacement downhole motor in proportion to the pump's speed. It is also possible to use a turbine or other type of downhole motor to drive the whirling cylindrical mass.

Even in cases where a positive displacement downhole motor is used as the drive source, it is possible that compressibility of the circulating fluid, uncertainties in the actual diameter of the borehole, leakage in the motor or pump, and pressure expansion effects in the tubing may prevent adequate control. In that case, a portion of the circulating medium can be shunted past the motor to provide a way to control the excitation frequency of the whirling cylindrical mass. The pump at the surface is controlled to provide a greater flow than necessary to achieve the desired excitation frequency, and this flow may change with time. The measured excitation frequency is then compared with a desired value. The measured frequency can either be transmitted from the surface or produced by downhole electronic systems, as is well known in the art. The downhole shunt valve is then operated to port fluid away from the positive displacement motor so as to maintain the measured excitation rate at the desired level. The downhole shunt valve may throttle fluid at the desired level. The downhole shunt valve may throttle fluid (i.e. act as a proportional control valve) or it may act in a fully opened or fully closed manner and to control the amount of fluid shunted past the motor by duty cycle modulation.

The outer surface of the whirling cylindrical mass can be controlled to create a high friction between the mass and either the borehole wall or the inside of a cased hole to promote development of the whirling motion. In a cased hole a high friction surface can be rubber with a tread that reduces any slipping tendencies due to fluid in the well. In an open hole operation the surface may have steel ribs, studs or such, in a rubber matrix to promote high friction between the side of the borehole and the whirling cylindrical mass.

The motor may be hung in the borehole with "slip" type elements so as to isolate the accelerations experienced by the whirling mass from the tubing string, in which case the use of a U-joint or flexible coupling is necessary. Such a hanging system can also be used in conjunction with the driver power being transmitted from the surface by the tubing string. In this case the hanging system can have a gearing system to change the rotational speed of the drive string to a speed that is optimum to drive the whirling cylindrical mass.

A "starter spring" system can be used to ensure that the whirling cylindrical mass is in contact with the borehole or the sidewall of a casing. A starter system ensures that a self-regenerative whirling motion begins in every circumstance. Basically, the starter system biases the position of the cylindrical mass to one side of the borehole or casing so that contact is ensured to allow an initial force to be created between the mass and the borehole wall. After rotation is initiated the regenerative nature of backward whirling motion ensures that frictional contact is continued. The starter system can be constructed to be retracted when whirling motion is started.

In one embodiment of the concept, the whirling cylindrical mass is never actually in contact with the borehole or casing. In this embodiment, the whirling mass acts as a pinion and the "contact" gear is an internal gear that is anchored in the open borehole or casing by means of "slips" or other systems. This embodiment has the advantages of eliminating the need to create friction between the whirling cylindrical mass and the borehole wall, ensures a known diameter of whirl, and also provides greater contact area so that less stress is placed on the borehole.

The downhole seismic energy source of this disclosure is different than an eccentric mass in several important ways. First, an eccentric mass must be rotated at its excitation frequency. This means that higher speed motors are required to achieve practical excitation frequencies. With the whirling cylindrical mass of this disclosure, however, the physics of whirling itself magnifies the frequency of excitation. This means that lower speed downhole motors can be used as a power source. Second, an excitation force of an eccentric mass must be transmitted through some kind of drive shaft. This means that the forces possible are limited due to physical stress limits in practical sized drive shafts. With a whirling cylindrical mass, however, the excitation force is supported by the borehole itself. This means that much greater excitation forces are possible.

When a mass is rapidly rotated in a borehole vibrational energy is not generated unless the mass backward whirls within the borehole. That is, it is necessary that the rotating mass have frictional contact with the borehole and unless and until such frictional contact is established, the rotating mass will not produce vibrational energy.

Various means are presented in the following specification for achieving frictional contact between a rotating mass and a borehole. One example of a system for causing the surface of a mass to establish frictional contact with a borehole wall is to provide frictional enhancing surfaces on the rotating mass. Frictional enhancing surfaces may be placed adjacent to the top or the bottom of an elongated mass or, if the mass is barrel shaped, the frictional enhancing surface can be in a band around the middle or larger diameter portion of the mass. Another method is to add a flexible elastomeric member of increased external diameter to the mass. The flexible member engages the borehole wall as the mass is rotated to initiate backward whirl. The flexible member will collapse so as to permit full contact of the surface of the mass with the borehole wall after backward whirl is achieved.

A further means of encouraging frictional contact between the mass and the borehole wall is to off-center the mass, such as by forming the mass of portions having different densities or locating the point of pivotation away from the rotational axis of the mass. The mass can also be made of non-circular cross-section as another way of increasing the frictional contact between the mass surface and the borehole.

To urge the mass towards the borehole sidewall so as to establish frictional contact a linkage member by which the mass is supported and rotated may be biased outwardly by a torsional spring.

Frictional imparting elements may be slidably secured to the mass, such as on the top surface and urged outwardly by a spring. These frictional elements first encounter the borehole sidewall as the mass is rotated to start the backward whirling action. Once backward whirling has initiated the frictional elements are moved inwardly as the mass is urged outwardly by centrifugal force so that the full external surface of the mass engages the borehole wall as the mass backward whirls.

An important feature of this invention is a system for creating vibrational energy in a borehole that can be expeditiously positioned into or removed from the borehole. A rotary source can be lowered into a desired position in a borehole by means of a wireline. Electrical signals controlled from the earth's surface can be used to extend arms from the rotary source to engage the borehole sidewall to thereby maintain the rotary source in a non-rotated position. A flexible coupling extending from a rotating shaft at the lower end of the rotary source can then be used to connect to a mass that is rotated to achieve backward whirling action within the borehole. When vibrational energy is no longer required, the arms can be retracted and the entire system removed by the wireline.

Another embodiment includes a tubular housing of diameter less than the internal diameter of the borehole. The housing can be lowered into a borehole on a wireline. The housing includes a rotary source, such as a motor, having a shaft. A flexible coupling attaches the shaft to a rotating mass. The rotating mass backward whirls within the interior of the tubular housing to create vibrational energy. Expandable slips on the exterior of the housing serve to maintain the housing in non-rotational relationship with the borehole and to transmit vibrational energy from the housing to the borehole.

The concept of generating a vibrational signal downhole, such as for use for seismic purposes, can be achieved by a system that is positioned within the interior of a drill pipe. For this application all components of the system must be of diameter that is less than the internal diameter of the drill pipe. A backward whirling mass within the interior of a drill string can be used to create vibrational energy that is transmitted to the earth surrounding the borehole. In this manner, vibrational energy, such as for use as a seismic signal, can be established in a borehole without the necessity of pulling the drilling string from the borehole.

The whirling mass can be arranged to have a smaller diameter portion and a larger diameter portion in the areas that contact the borehole wall. The different diameter portions of the mass create different whirl rates, and the different whirl rates cause the mass to apply varying centrifugal forces to the borehole sidewall. In some instances, the forces applied by the smaller and larger diameter portions of the mass are applied to the same side of the borehole sidewall, while at other times the forces of the larger diameter portion of the mass are applied to the borehole sidewall at 180 degrees relative to the force of the mass applied by the smaller diameter portion. The use of a mass having a larger and a smaller diameter portion provides a more complex vibrational signal which may have applications for particular geophysical processes.

The backward whirling mass of this disclosure operating in a borehole provides a source of seismic signals. The signals radiate in the earth. By placement of geophones at remote locations, such as in an adjacent borehole or on the earth's surface or a combination of the two, much information can be procured as to the rate of travel and the reflection of the seismic signals. Upon analysis of the receipt of the seismic signals by the geophones, a geophysicists can then learn much about the structure of the earth surrounding the borehole and the structure of the earth in the area between the borehole at the point where the seismic signals are generated by the backward whirling force and the earth's surface or the adjacent well. The seismic signals are received, preferably by a plurality of geophones either at the earth's surface or at an adjacent borehole or both, and the received signals recorded and analyzed. The analysis of the received signals resulting from the seismic signals created by the backward whirling mass can be carried out at the site or preferably at a location having the resources, including adequate computer technology, for analyzing the received signals resulting from the seismic energy generated by the backward whirling mass so as to provide information as to the geophysical structures surrounding the borehole.

The high energy level achieved by the downhole vibrational energy source of this invention has many applications in the petroleum industry. When used as a seismic signal the vibrational energy source makes it possible to more effectively obtain inverted vertical seismic profiles of the earth surrounding a borehole. Improved crosswell tomography geophysical techniques can be practiced using the high energy vibrational source of this disclosure. Of particular importance is the possibility of obtaining improved geophysical information by practicing downhole vertical seismic techniques using the high energy source as disclosed herein. Finally, the high energy vibrational source of this disclosure makes it feasible to produce ultra long spaced acoustical logs of a well borehole.

Many types of cementing, work over, perforating clean out and production enhancement techniques that are typically carried out in oil and/or gas producing wells can be improved when combined with the down hole high vibrational energy source of this disclosure. For example, cementing, gravel packing, well clean out operations, production enhancement techniques and cement squeeze job preparation techniques in which the downhole vibrational energy source of this invention are employed will be described.

A better understanding of the invention may be obtained with reference to the following description, taken in conjunction with the attached drawings.

DESCRIPTION OF THE DRAWINGS

FIG. 15 is a diagrammatic view of a generally cylindrical mass supported in a borehole by a flexible linkage.

FIG. 16 is cross-sectional view taken along the line 16—16 of FIG. 15 showing that the elongated generally cylindrical mass is formed of heavier and lighter portions so that the mass is off balance, that is, so that the center of gravity is displaced from the rotational axis of the mass to cause the mass to be displaced as it is rotated to augment frictional contact with the borehole sidewall.

FIG. 17 is an elongated generally cylindrical mass as shown in FIG. 15 but wherein the point of pivotation is off-set from the rotational axis of the mass. This off-set causes the mass to wobble as rotation is initiated to increase the likelihood of the mass engaging the cylindrical wall to initiate backward whirling.

FIG. 18 is an elongated mass as illustrated in FIG. 15.

FIG. 19 is a cross-sectional view taken along the line 19—19 of FIG. 18 showing that the mass is of a generally elliptical cross-sectional configuration such configuration enhances the frictional engagement of the external surface of the mass with the borehole sidewall as the mass is rotated.

FIG. 20 shows is a diagrammatic elevational view of a mass supported in a borehole by pivotal linkage extending from a rotational shaft. At the point where the linkage is pivotally attached to the rotational shaft a torsional spring is employed to urge the mass to extend at an angle with respect to the rotational shaft to thereby cause the mass to more effectively frictionally engage the borehole sidewall to initiate backward whirling.

In FIG. 25 the mass is fully concave, with the point of pivotation adjacent to the lower end of the mass but within the mass concavity.

FIG. 36 shows the rotary source positioned within the borehole and held there by expandable arms and with the mass being rotated to backward whirl within the borehole.

FIG. 49 is an elevational cross-sectional diagrammatic view of a lower portion of a borehole in the earth with a casing extending into it and illustrating the method of use of a backward whirling mass within the casing to assist in consolidating cement that has been injected into the annular area between the exterior of the casing and the borehole.

FIG. 50 is an elevational cross-sectional view of the lower portion of a borehole extending to the earth's surface and showing cement in the annular area between the exterior of the casing and the borehole and with perforations in the casing and through the cement and into a producing formation, the perforations serving to communicate the producing formation with the interior of the casing, and showing a method of use of a backward whirling mass to assist in cleaning out the perforations to improve the flow of fluid from the producing formation.

DESCRIPTION OF THE PREFERRED EMBODIMENTS

Figure 1:
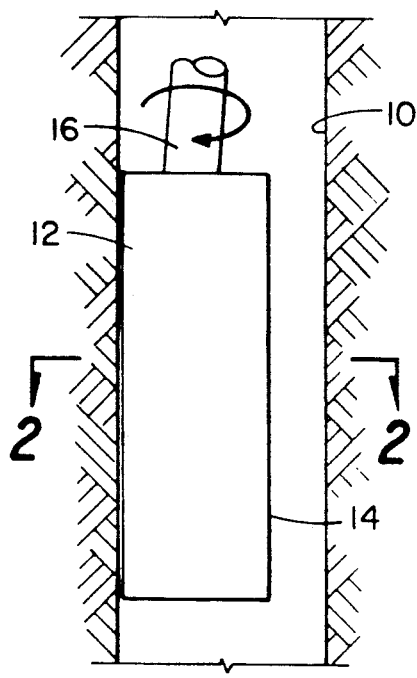
FIG. 1 is a basic view of the apparatus for practicing the principles of this invention in the form of a cylindrical mass rotated in a borehole, the mass being in contact with the borehole so that as it is rotated, the mass migrates in the direction opposite of rotation around the borehole to create large centrifugal forces.

Referring to FIG. 1, the basic concept of this invention is illustrated diagrammatically and is illustrated for use in an open borehole. The concept of FIG. 1 can also be used in a cased borehole. A borehole 10 extends from the earth's surface, as drilled in the usual manner for drilling oil or gas wells. The object of the present invention is to generate a seismic energy signal, that is, to generate pressure wave signals that travel in the earth and that can be detected by geophones placed on the earth or in adjacent boreholes. Through the science of seismology the detected seismic waves can be analyzed to provide geologists with important information concerning the structure through which borehole 10 traverses and the structure surrounding the borehole.

Positioned within the borehole is an elongated cylindrical mass 12 having an external cylindrical or nearly cylindrical surface 14. The external surface 14 could be rough or have ribs or other non-cylindrical features. The mass is rotated by a rotational means 16 in a manner to be described subsequently. Cylindrical surface 14 is in contact with borehole wall 10.

Figure 2:
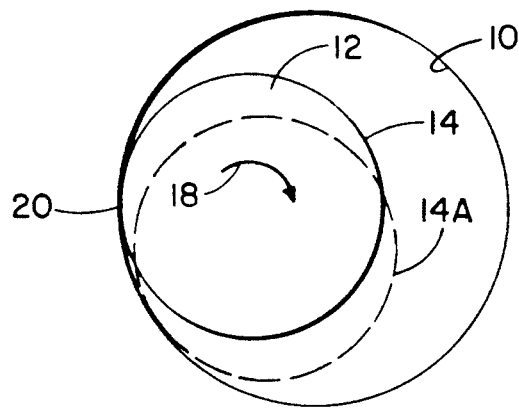
FIG. 2 is a cross-sectional view taken along the line 2—2 of FIG. 1 showing the cylindrical mass in cross-section and illustrating how the mass whirls within the borehole to create centrifugal force.

FIG. 2, a cross-sectional view of FIG. 1, illustrates the concept of this disclosure. Assuming cylindrical mass 12 is rotated clockwise in the direction indicated by arrow 18, the mass, due to frictional contact with the borehole wall, will migrate or "backward whirl" in a counterclockwise direction, that is, the direction opposite of that of arrow 18. After an incremental time the mass will take the position as indicated by 14A. The mass will continue to rotate in a counterclockwise direction, whirling around the interior of borehole 10.

Assuming no slip at the contact point 20 between external surface 14 of the cylindrical mass and borehole wall 10, the whirling mass will contact each point on the borehole wall, such as at point 20 at a frequency rate according to the formula:

$$f = \frac{D}{P}(RPM)\frac{1}{60}$$

Where "f" is the excitation frequency in Hz;
Where "Dw" is the diameter of borehole 10;
Where "RPM" is rotations per minute;
Where "P" is the difference in the diameter of the borehole 10 and the diameter of the cylindrical mass 12 (P=Dw−D);
Where "D" is the diameter of the cylindrical mass 12.

As an example, if cylindrical mass 12 has a diameter of 4.5 inches and borehole 10 has a diameter of 5 inches or, instead, if the borehole is the interior of a casing, a sinusoidal varying force at 37.5 Hz will be created by the backward whirl of the cylindrical mass when it is rotated at 250 RPM.

The contact force of cylindrical mass 12 against each point of contact with borehole wall 10 is expressed according to the formula:

$$Fc = (.0000141)D^2 \frac{RPM^2}{P}(W)$$

Where "Fc" is the force of contact;
Where "W" is the weight of the cylindrical mass.

The centrifugal acceleration in "g's" of the whirling mass is determined by the formula:

$$.0000141 \frac{D^2 RPM^2}{P}$$

If in the example given above wherein cylindrical mass 12 is 4.5 inches in diameter and is formed of steel and is 10 feet long, and with a diameter of borehole 10 equaling 5 inches, at 250 RPM the whirling mass would create about 19,440 pounds of sinusoidal varying force at 37.7 Hz.

Figure 3:
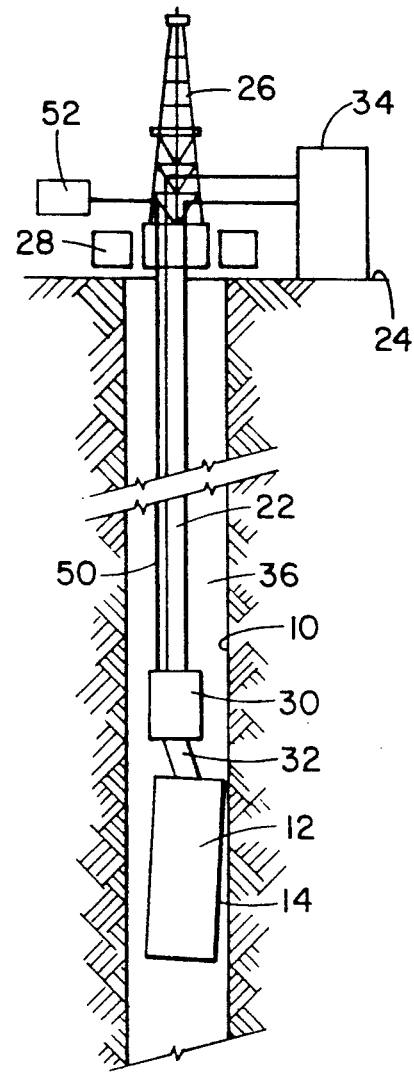
FIG. 3 is a diagrammatic elevational view of a borehole extending from the earth's surface showing an apparatus for use in applying rotational energy to the cylindrical mass.

FIG. 3 shows more details of the typical application of the concepts of FIGS. 1 and 2. Positioned within borehole 10 is a tubing string 22 extending from the earth's surface 24 and suspended by a surface system 26 of the type typically employed for drilling or working over an oil or gas well. The surface system 26 may include a source of rotary energy 28 of the type such as used for rotating a drill string during drilling operations which may be adapted to be rotated at higher speeds. By rotating tubing 22 cylindrical mass 12 can be rotated to generate a seismic energy signal in the method as previously described.

Figure 4:
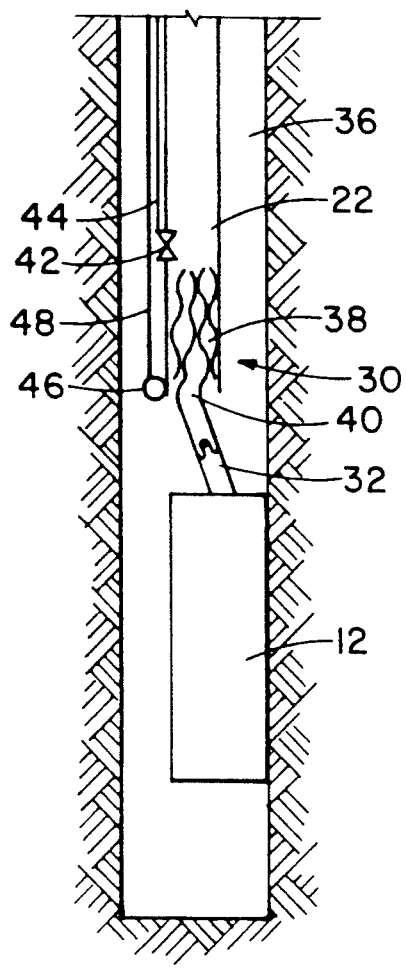
FIG. 4 is another elevational diagrammatic view of the subsurface portion of the borehole showing a type of positive displacement downhole pump that may be used for applying rotational energy to a centrifugal mass.
Figure 39:
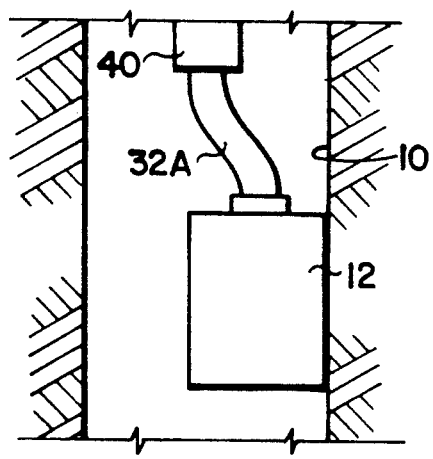
FIG. 39 is an elevational view of a mass for backward whirling in a borehole similar to that which is illustrated in FIGS. 1, 2 and 6. The mass is rotated by a flexible shaft which functions to transmit rotational torque to the mass but which permits the mass to freely deviate away from alignment with the rotational energy source to fully impact the borehole sidewall.

Instead of rotating tubing string 22 a rotary power source 30 may be suspended by the tubing string and connected to cylindrical mass 12, such as by means of a coupling member 32. The rotary power source 30 may be an electric power, either DC or AC, or a downhole hydraulic motor. When the rotary power source is a downhole hydraulic motor, a source of hydraulic power 34 is provided at the earth's surface and connected to tubing string 22 by which fluid under pressure is forced downwardly through the tubing to the rotary power source 30. The fluid passes out of the rotary power source and into the well annular area 36 and back to the earth's surface. FIG. 4 shows one means of providing a rotary power source 30 of the hydraulic type. In this type, the rotary power source is a positive displacement downhole motor 38 affixed to tubing string 22. The motor 38 has a shaft 40 connected to coupling member 32 that may be in the form of a flexible coupling or universal joint by which the rotary energy from positive displacement motor 38 is coupled to cylindrical mass 12. FIG. 39 illustrates a flexible shaft 32A extending from motor shaft 40 to mass 12 to transmit rotary torque to the mass but which permits the mass to freely backwards whirl in contact with the sidewall of borehole 10.

As fluid is forced down the interior of tubing string 22, it passes through the positive displacement motor 38, causing shaft 40 to rotate, the fluid returning in the annular area 36 back to the earth's surface. In some applications it may be important to control the RPM of the whirling cylindrical mass 12 so as to control the frequency of the seismic energy signal being generated. This can be accomplished in a variety of ways. In one way as illustrated in FIG. 4, a shunt bypass valve 42 is positioned in communication with the interior of tubing string 22 above the rotary power source 30. By means of a conductor 44 extending to the earth's surface, electrical signals may be applied to shunt bypass valve 42 to control the opening and closing of the valve. When valve 42 is opened, or partially opened, some of the hydraulic fluid flowing downwardly through tubing string 22 is diverted directly into the well annulus 36 and therefore does not flow through positive displacement motor 38. Therefore, it can be seen that by bypassing a portion of the fluid flow the rotary force generated by positive displacement motor 38 can be altered, to thereby alter the RPM of rotation of cylindrical mass 12.

Another way of controlling the RPM of cylindrical mass 12 when rotated by a positive displacement motor, as illustrated in FIG. 4, is by controlling at the earth's surface the rate of fluid output of the hydraulic power source 34, as shown in FIG. 3. Thus, in summary, the rate of rotation of cylindrical mass 12 and therefore the frequency of the seismic energy signal can, when the power source is hydraulically actuated, be controlled by means at the earth's surface or downhole to achieve the desired frequency of the seismic energy signal.

To determine the frequency of the seismic signal generated by the whirling cylindrical mass 12 an accelerometer 46, or other frequency sensing device, may be affixed to the lower end of the tubing string or on the whirling mass. By a conductor 48 extending to the earth's surface a signal can be delivered to indicate to operators at the earth's surface the frequency of the signal so as to be able to control the frequency to obtain that which is desired.

Referring back to FIG. 3, as previously stated, rotary power source 30 may be an electric motor supplied by electric energy over cable 50 extending to the earth's surface and connected to a source of electrical power 52.

Figure 5:
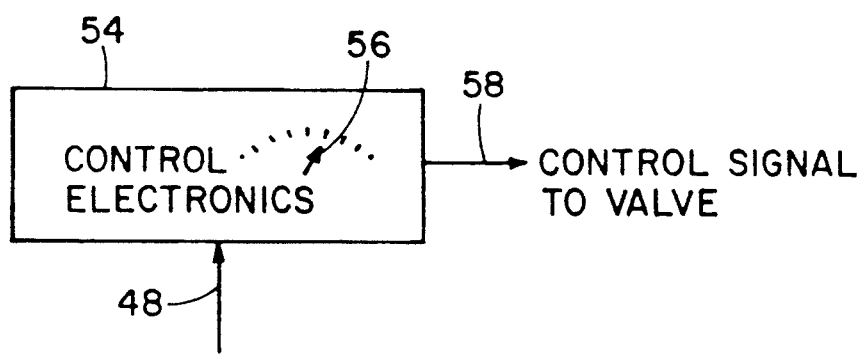
FIG. 5 is rudimentary diagram of means for controlling the rate of rotation of a centrifugal mass so as to produce seismic energy signals having a desired frequency characteristic.

As referenced in FIG. 4, the measured frequency of the seismic signal generated by whirling cylindrical mass 12 can be detected by accelerometer 46. FIG. 5 shows a means of using such detected measurement to attain the desired frequency of the seismic energy signal. The measured signal appears on cable 48 as previously described. This signal is fed to control electronics 54 having a frequency selector 56 input by which the desired frequency of the required seismic signal is selected. The selected frequencies could change with time. The control electronics 54 compares the desired frequencies selected at 56 with the detected frequency appearing on conductor 48 and generates an output signal at 58 that can be connected, such as to conductor 44, to control shunt valve 42. Alternatively, output signal 48 can be used to control the source of hydraulic power 34 as shown in FIG. 3. Where rotary power source 30 is electrically operated, control signal 58 may be used to control either the voltage, if the rotary power source is a DC motor, or the frequency of the power signal if the rotary power source is a AC motor.

Figure 6:
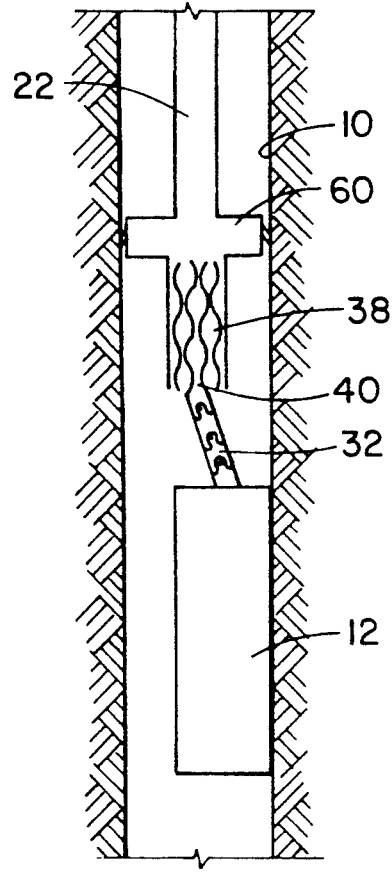
FIG. 6 is an elevational view of the downhole portion of a borehole showing diagrammatically the use of a borehole anchoring means for anchoring the motor used for rotationally driving the cylindrical mass.

With tubing string 22 suspended in a borehole or a casing as shown in FIG. 3, and with a rotary power source 30 at the lower end of tubing string it can be seen that the tubing string would be subject to substantial vibration as power is applied to rotate cylindrical mass 12. An alternate arrangement is illustrated in FIG. 6 which shows a lower end portion of borehole 10 with tubing string 22 extending from the earth's surface. Positioned at the lower end of tubing string 22 is a borehole anchor means 60. This may be in the form of slips or a hydraulic mechanism as is commonly employed in the oil and gas well drilling industry. The rotary power source, such as positive displacement motor 38, is supported below borehole anchor means 60. Flexible coupling member 32 extends from the positive displacement motor shaft 40 to connect to the whirling cylindrical mass 12. Thus, the borehole anchor means serves to anchor the lower end of tubing string 22 to prevent undue vibration of the tubing string as the whirling cylindrical mass 12 is rotated. It is also possible to have motor 38 positioned above anchor means 60 with shaft 40 extending through the anchor means to connect to flexible coupling member 32.

Figure 7:
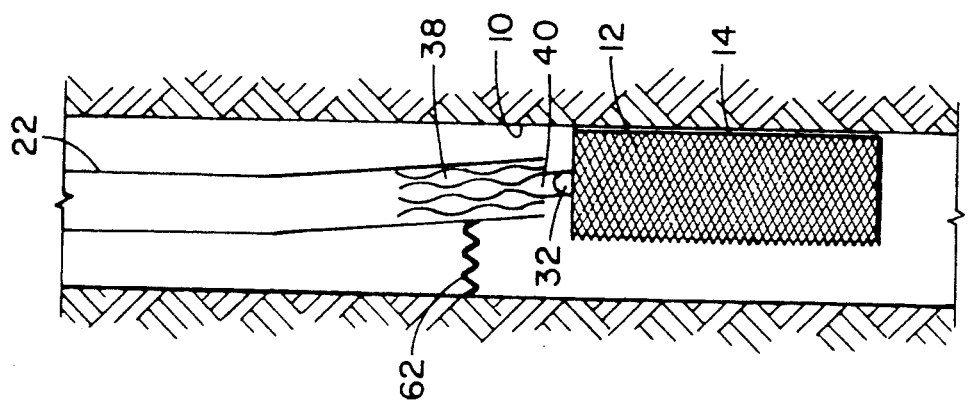
FIG. 7 is a diagrammatic view of a downhole mechanism for practicing the invention showing a spring bias means for urging the cylindrical mass into frictional contact with the borehole sidewall so that, when the mass is rotated, it will migrate in a whirling motion within the borehole.

In order for the whirling cylindrical mass 12 to rotate within the borehole or casing, cylindrical surface 14 must be in frictional contact with borehole wall 10, or the wall of the casing if operated within a casing. It can be seen that if the cylindrical mass is merely rotated within a borehole, no frictional contact is established between the rotating mass cylindrical surface and the interior of the borehole, that is, the mass will not whirl within the borehole to create a seismic source. For this reason, as illustrated in FIG. 7, a biasing force, exemplified by a bias spring 62, may be employed. The function of bias spring 62 is merely to hold cylindrical mass 12 so that cylindrical surface 14 is in frictional contact with borehole wall 10. In this matter, when rotary energy is applied to cylindrical mass 12 it will migrate in a direction opposite of its direction of rotation around borehole wall 10. Once the whirling migration is initiated the centrifugal force applied by the rotating cylindrical mass is such as to sustain the frictional engagement of the cylindrical mass with the wall. The only time the biasing force, as exemplified by biasing spring 62, is required is at the initiation of the rotation of the cylindrical mass to make sure that it is in frictional contact with borehole 10 and once the rotation is initiated, biasing spring 62 is no longer required.

In order to increase the frictional contact of the whirling mass 12 with borehole 10, the whirling mass cylindrical surface 14A may be roughed, ribbed or otherwise provided with a pattern, such as protruding diamond shaped projections as shown in FIG. 7. This arrangement reduces slippage between the surface of whirling mass and the borehole so that the backward whirl of the mass occurs at a more predictable rotational rate.

Figure 8:
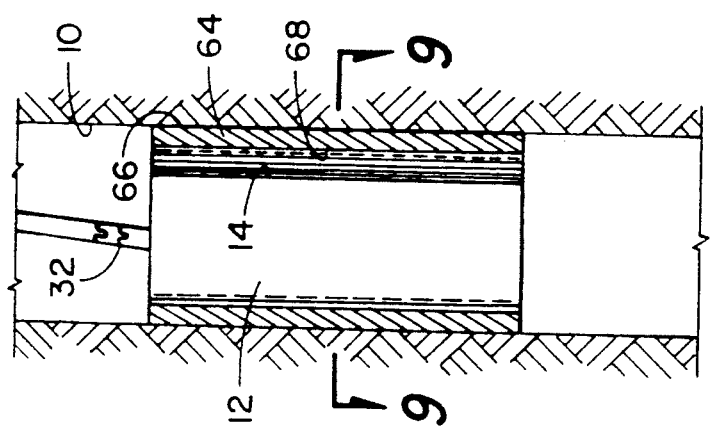
FIG. 8 is a diagrammatic view of the subsurface portion of a borehole showing a cylindrical mass positioned within the borehole and showing mounted in the borehole a tubular base member against which the cylindrical mass rotates, the tubular base member having an internal cylindrical surface arranged to provide improved frictional engagement between it and the cylindrical mass sidewall.

Another means to increase the frictional engagement of rotating cylindrical mass 12 with the interior of the borehole and thereby provide a more certain whirling diameter is illustrated in FIG. 8 which shows the employment of a tubular base member 64. The external cylindrical surface 66 of the tubular base member fits in close contact with borehole 10. Tubular base member 64 may include a wall anchor system that may be hydraulically or mechanically actuated, such as to anchor the tubular base member to borehole 10. The tubular base member 64 may be made of hard rubber, polyurethane or other material that provides an interior cylindrical surface 68 having a high co-efficient of friction surface. With tubular base member 64 properly positioned within borehole 10, cylindrical mass 12 will whirl with less slippage as it is rotated.

While tubular base member 64 may be a smooth high friction interior surface 68 an alternate arrangement, as illustrated, includes the provision wherein the tubular base member includes a tubular contact gear member 70 having teeth 72 on the interior cylindrical surface. The exterior cylindrical surface 14 of cylindrical mass 12 is likewise provided with teeth 74 that mesh with the teeth 72 on the tubular contact gear member.

Figure 9:
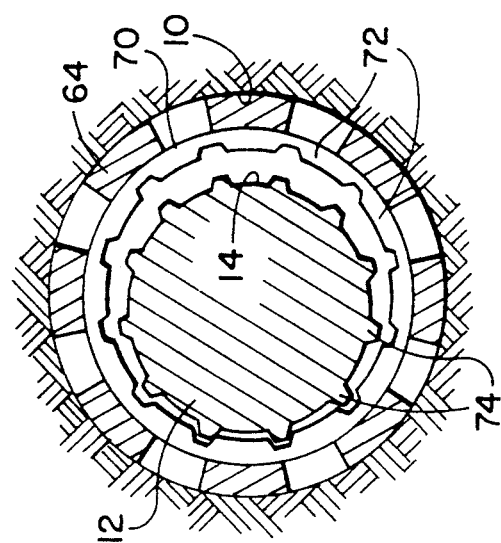
FIG. 9 is a cross-sectional view as taken along the line 9—9 of FIG. 8 showing the arrangement wherein the tubular base member has internal teeth therein and wherein the cylindrical mass has externally extending teeth, the teeth meshing so that the cylindrical mass is rotated as it whirls within the tubular base member in a gear-like arrangement.

In the embodiment of FIG. 9, the rotation of cylindrical mass 12 will take place as teeth 74 mesh with teeth 72 on the tubular contact gear member 70 so that no slippage of the cylindrical mass relative to the borehole can occur.

Tubular base member 64 may include a wall anchor system that may be hydraulically actuated, such as to anchor the tubular base member to borehole wall 10.

Thus, the system of this invention provides a relatively inexpensive means of achieving a high intensity seismic energy signal in an open or cased borehole. The high energy is achieved since the borehole itself, or if operated within a casing the casing itself, forms an integral part of the energy system. That is, the whirling cylindrical mass transfers energy into the earth via the tubular base 64 so that maximum energy transfer of the seismic signal is obtained without the possibility of damaging the integrity of the well borehole.

When a mass is rotated within a borehole it is necessary that frictional contact between the mass and the borehole be established before backward whirling can be achieved. Various means may be employed for augmenting or initiating the frictional engagement of a mass with a borehole and examples of these are illustrated in FIGS. 10 through 26 and 28 through 35.

Figure 10:
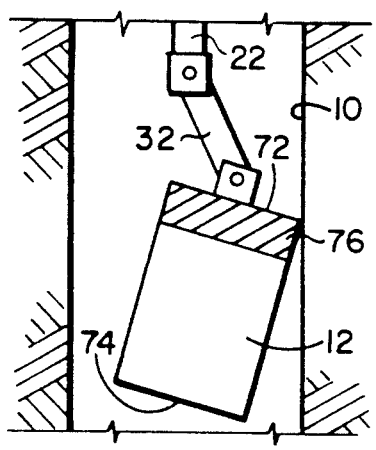
FIG. 10 is a diagrammatic view of a generally cylindrical elongated mass supported for rotation in a borehole. The mass is rotationally supported by a pivotal linkage. To increase frictional contact between the mass and the borehole to initiate backward whirling a friction enhancing surface band is formed adjacent to the top of the mass.

In FIG. 10 the mass 12 is elongated and of a generally cylindrical configuration. The mass has a top 72 and bottom 74. Positioned on the external surface adjacent the top is a textured frictional enhanced area 76 that, when engaged with borehole sidewall 10, increases frictional relationship to thereby initiate backward whirling of the mass.

Figure 11:
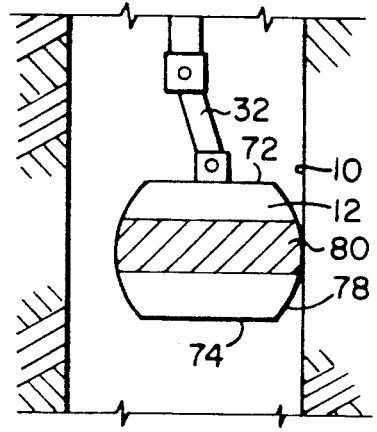
FIG. 11 is a diagrammatic view of a mass having a general barrel shape external configuration, that is, the mass is of a larger diameter in the middle than at the upper and lower ends. A band of friction enhancing surface band is formed on the exterior of the mass at the enlarged diameter portion spaced intermediate the mass upper and lower ends.

FIG. 11 shows an arrangement wherein mass 12 has a barrel shaped external peripheral surface 78 that is of larger external diameter than the diameters adjacent top 72 and bottom 74. This increased diameter surface portion is provided with a textured frictional enhanced band 80 that engages borehole sidewall 10 to initiate backward whirling.

Figure 12:
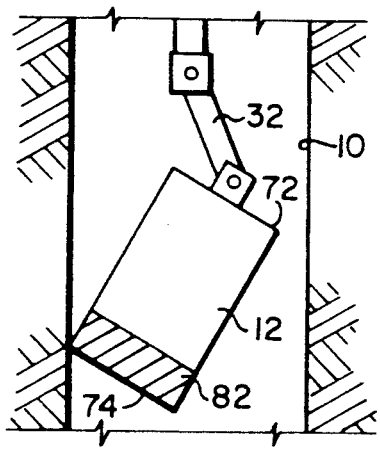
FIG. 12 is a diagrammatic view as in FIG. 10 but showing the friction enhancing surface in a band spaced near the bottom of the mass to initiate backward whirling as the mass is rotated.

FIG. 12 is an embodiment as shown and described with respect to FIG. 10 except that the textured frictional enhanced band 82 is positioned adjacent mass bottom 74.

Figure 13:
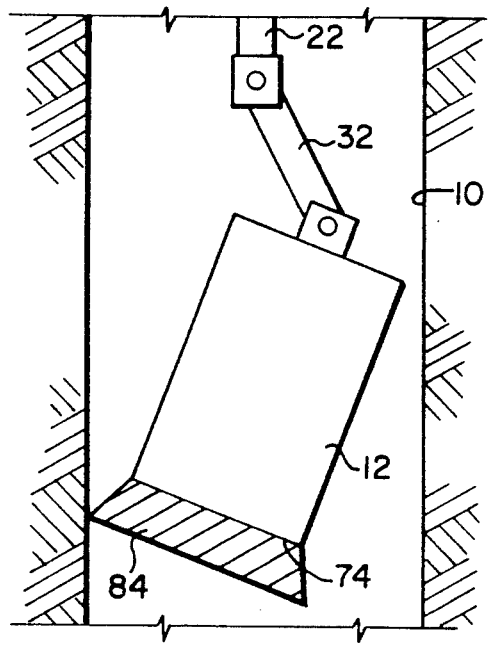
FIG. 13 is a diagrammatic view of an alternate embodiment of the mass including a flexible oversized frictional enhancing element affixed to the bottom of the mass. This element extends out to contact the borehole sidewall as the mass is rotated to initiate backward whirling.
Figure 14:
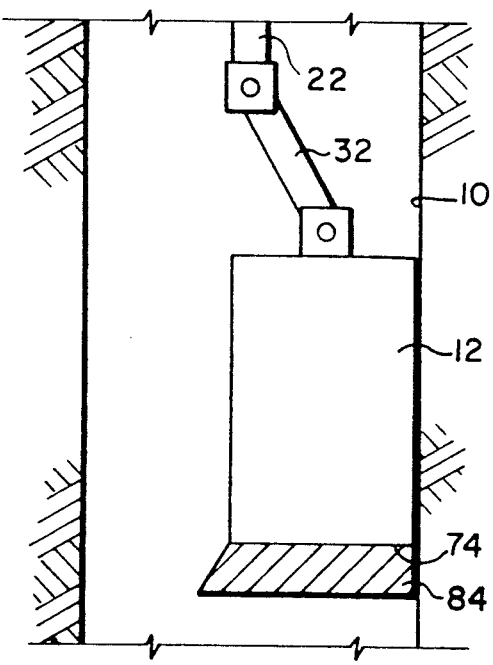
FIG. 14 shows the embodiment of FIG. 13 as the mass is backward whirled against the borehole sidewall, the centrifugal force serving to compress the flexible friction enhancing element to permit full contact of the mass external surface with the borehole sidewall.

FIGS. 13 and 14 show another way of establishing frictional contact between the mass and the borehole sidewall. Affixed to bottom 74 of mass 12 is a circumferential elastomeric member 84 made such as of rubber or deformable plastic. The elastomeric member 84 is of a diameter greater than that of mass 12 so as to augment engagement with borehole wall 10. Once frictional engagement with the borehole is established the rotating mass starts to backward whirl and centrifugal force moves the mass continually outwardly against borehole wall 10 to compress elastomeric member 84 where the mass engages the borehole wall as shown in FIG. 14. This permits the full peripheral surface of the mass to engage the wall for maximal vibration energy generation.

FIGS. 15 and 16 show an alternate means of causing the mass, once rotation is initiated, to contact the borehole sidewall so as to start backward whirl. As shown in FIG. 16, a cross-sectional view, the mass is formed of two portions, that is a lighter weight portion 86 and a heavier weight portion 88. Due to the difference in specific gravities of portions 86 and 88, the mass will wobble as rotation is initiated even though the point of pivotation 90 is coincident with the mass rotational axis 92. As the mass wobbles frictional engagement with the borehole is enhanced.

FIG. 17 shows how a similar result can be accomplished. The point of pivotation 90 at top 72 is off-set from the mass axis of rotation 92. This off-set will cause the mass to be unbalanced and to wobble as it is rotated and therefore more quickly engage the borehole sidewall.

FIGS. 18 and 19 show another means of achieving increased frictional contact between rotating mass 12 and borehole sidewall 10. As shown in FIG. 19 the mass is non-cylindrical and, as illustrated, is elliptical. Other cross-sectional configurations may be utilized so that the mass is non-circular. As the mass whirls the non-circular external configuration causes changing centrifugal force of the mass with the borehole sidewall. This not only increases the frictional engagement between the mass and the borehole sidewall but also increases the vibrational energy caused by the backward whirling mass. The elliptical external configuration of the mass is indicated by the numeral 94.

In FIG. 20 mass 12 is shown supported by linkage 32 extending from rotational shaft 22 as previously described. Linkage 32 is attached to the mass at a point of pivotation 90 and is inclined at an angle with respect to shaft 22 to urge the mass into contact with borehole sidewall 10. This is accomplished by use of a torsional spring 96 interposed between rotational shaft 22 and linkage 32. With all of the various embodiments that have been described for augmenting frictional contact between the rotating mass and the sidewall of a borehole so as to initiate backward whirl it must be understood that once backward whirl is established the means of initiation becomes irrelevant or at least of very secondary significance. In FIG. 20 the torsional spring 96 is no longer a factor once backward whirl is initiated because of the enormous centrifugal forces that develop compared to the force of spring 96. The only function of spring 96 is simply to initiate initial frictional contact so as to cause backward whirl to begin.

Frictional contact can be established when a mass is rotated in a borehole if the mass is unbalanced in some way so as to cause it to wobble out of inline rotation. Wobbling action will cause at least a portion of the mass to move out to engage the borehole sidewall to initiate frictional engagement. Once frictional engagement is initiated the centrifugal force resulting from backward whirl augments the frictional contact so that normally all that is required to cause backward whirl is a trigger mechanism to initiate frictional contact between the rotating mass and the borehole sidewall. FIGS. 21 through 33 show various means of achieving this frictional contact initiation by unbalancing the rotating mass to cause it to selectably wobble as it is rotated.

Figure 21:
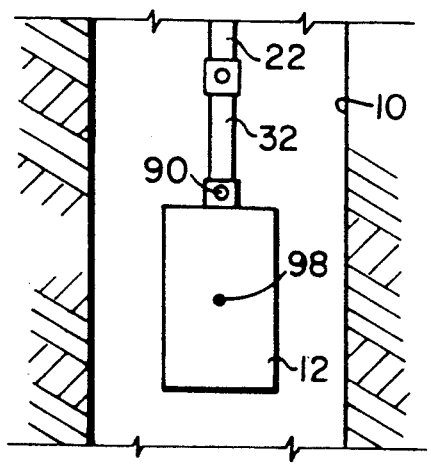
FIG. 21 is a diagrammatic view of a mass positioned within a borehole, the mass being supported from a rotational shaft by means of a linkage and in which the center of gravity of the mass is below the point of pivotation.
Figure 22:
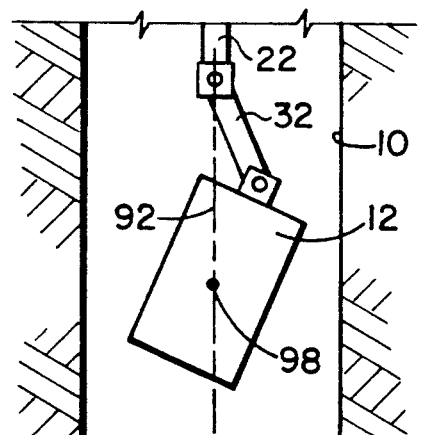
FIG. 22 shows the arrangement of FIG. 21 with the mass being rotated. The elongated mass will tend to tilt as it is rotated and such tilting increases the likelihood of the mass contacting the borehole sidewall to establish frictional contact to start backward whirling.

In FIG. 21 the center of gravity 98 of mass 12 is below point of pivotation 90 of linkage 32. Since the center of gravity 98 is displaced below the point of pivotation 90, there is a tendency for the mass to wobble as it is rotated as indicated in FIG. 22. This wobbling causes portions of the mass to be displaced outwardly to contact borehole sidewall 10 and initiate backward whirl.

Figure 23:
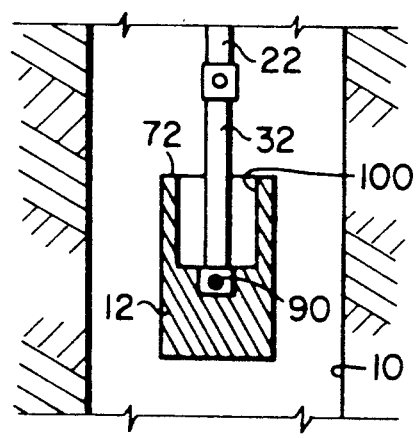
FIG. 23 is a diagrammatic view showing the mass supported by a linkage extending from a rotational shaft with the mass shown in cross-section. In this arrangement a deep cavity is formed in the upper portion of the mass so that the point of pivotation of the linkage with the mass is within the cavity and therefore is displaced below the top of the mass.
Figure 24:
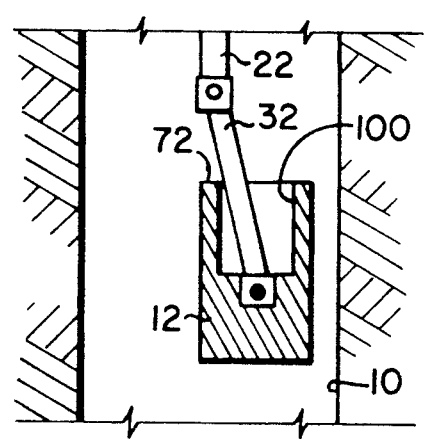
FIG. 24 shows the arrangement of FIG. 23 with the mass being rotated. The mass is shown as it appears after having established frictional contact with the borehole sidewall and is rotating in a backward whirl with the mass external elongated peripheral surface fully engaging the borehole sidewall.

FIGS. 23 through 26 show a rotating mass having a concave area 100 formed in top 72 of the mass. The point of pivotation 90 is moved downwardly as shown in FIG. 23, within the concavity 100, and the concavity permits linkage 32 to extend at the angle required so that mass 12 translates without tilt to engage borehole sidewall 10 as shown in FIG. 24.

Figure 25:
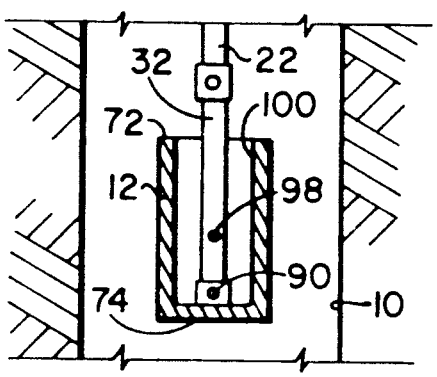
FIG. 25 is a further evolution of the arrangement of FIGS. 23 and 24.
Figure 26:
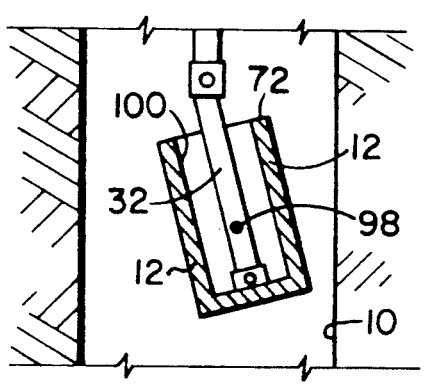
FIG. 26 shows the embodiment of FIG. 25 being rotated. The configuration of the mass causes it to tilt upon rotation to thereby engage the borehole sidewall to initiate backward whirl.

In FIG. 25 concavity 100 is deepened so that point of pivotation 90 is near mass bottom 74. As shown in FIG. 26, this causes the mass to tilt as it is rotated to engage borehole sidewall 10.

Figure 28:
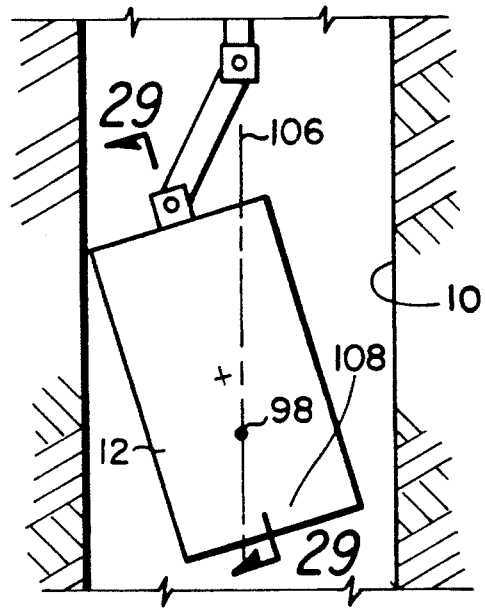
FIG. 28 is a diagrammatic view of a mass being rotated and in which the center of gravity is in the lower portion of the elongated generally cylindrical mass and in which a band having a frictional engaging surface is formed on the top of the mass to augment backward whirling.
Figure 29:
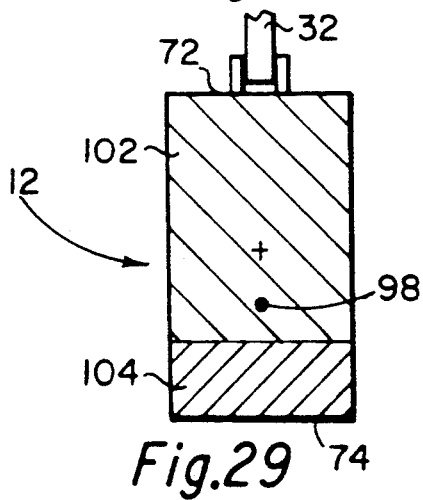
FIG. 29 is a cross-sectional view taken along the line 29—29 of FIG. 28 showing that the mass is formed of a light material in the upper portion thereof and a heavy material in the bottom portion so as to shift the center of gravity toward the bottom of the mass.

As shown in FIGS. 28 and 29, the center of gravity 98 of the mass may be shifted toward its top or bottom to cause the mass to tilt as it is rotated. In FIG. 29 the upper portion 102 is formed of light material and heavy material is used for the bottom portion 104. This causes the center of gravity 98 to shift towards the bottom and consequently the mass will tilt as it rotates about center of gravity 98. As shown in FIG. 28, vertical axis 106 extends through the center of gravity 98 as the mass is initially rotated. However, once backward whirling starts, rotational axis 106 becomes coincident with the geometrical axis of the mass since it is held against the borehole sidewall by centrifugal force. In FIG. 28 a textured frictional enhanced band 108 is applied on the exterior surface of the mass near the bottom.

Figure 30:
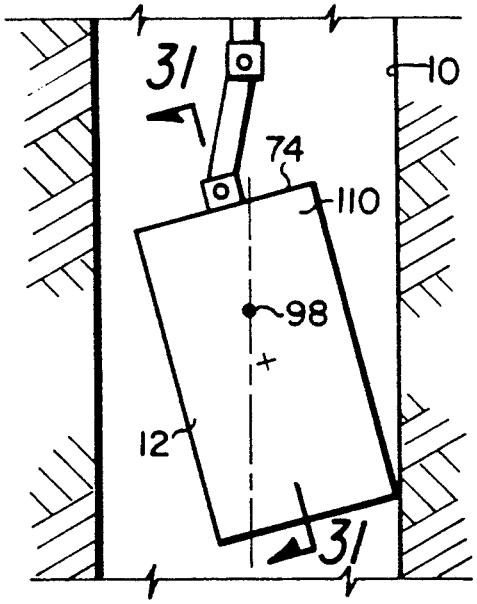
FIG. 30 is a diagrammatic view as in FIG. 29 with the center of gravity shifted toward the top of the mass and the friction enhancing band on the exterior surface being positioned at the bottom of the mass.
Figure 31:
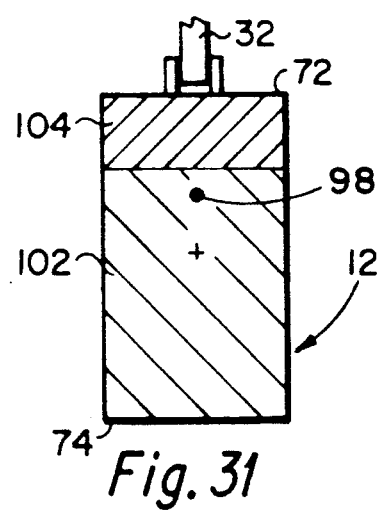
FIG. 31 is a cross-sectional view taken along the line 31—31 of FIG. 30 showing the construction of the mass having heavier material in the upper portion and lighter material in the lower portion so that the center of gravity is shifted towards the top of the mass.
Figure 32:
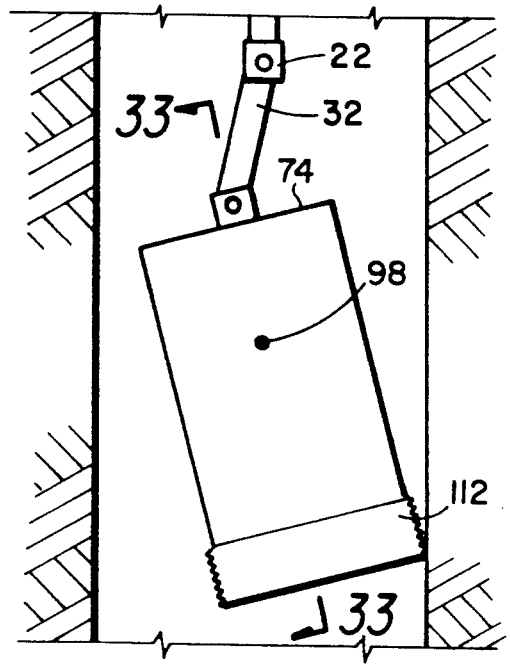
FIG. 32 is another embodiment of the mass shown diagrammatically and as it is rotated in a borehole. In this embodiment the center of gravity of the mass is near the top, whereas a band of frictional enhancing surface is applied adjacent the bottom of the mass.
Figure 33:
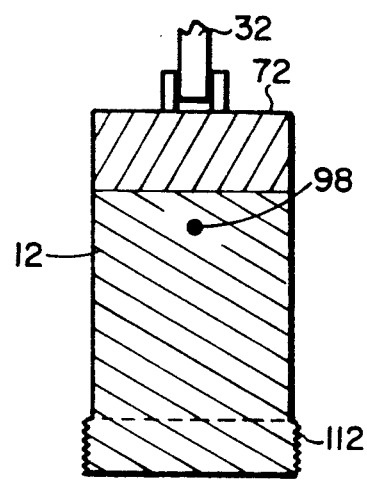
FIG. 33 is a cross-sectional view as taken along the line 33—33 of FIG. 31 showing that the mass is formed of a heavy material and a light material with the heavy material being adjacent the top and with the band of friction enhancing surface being formed at the bottom of the mass.

FIGS. 30 and 31 are like FIGS. 28 and 29 except heavier component 104 is near top 72 and the lighter component 102 is at bottom 74 to cause the center of gravity 98 to shift to adjacent top 72. In the embodiment of FIG. 30 the band of textured frictional enhanced area 110 is placed near top 72 of the mass. FIGS. 32 and 33 show the same arrangement as FIGS. 30 and 31 except that the band of enhanced frictional engaging surface 112 is placed at the bottom while the center of gravity 98 is adjacent the mass top 74.

Figure 27:
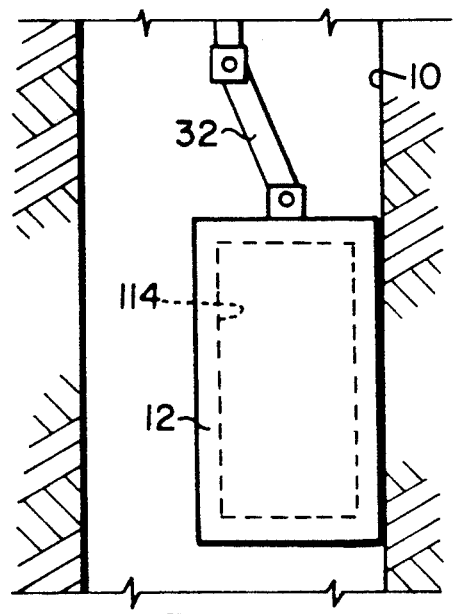
FIG. 27 shows a mass in the process of backward whirling within a borehole. In this embodiment the mass is hollow so that the weight is concentrated in the cylindrical periphery. This arrangement permits the force generated to be independently controlled from the whirl frequency and from the mass link which can control the starting tendencies.

FIG. 27 shows an alternate embodiment of the invention. In this example mass 12 is elongated and generally cylindrical but, unlike the other embodiments, is hollow, that is, it has a hollow interior 114. This hollow interior concentrates the bulk of the weight of rotating mass 12 at the circumference of the mass. The hollow mass allows the force generated to be independently controlled from the whirl frequency. Further, the length of the mass can control the starting tendencies, that is, the longer the mass the more likely it will be unbalanced and wobble as rotation is initiated and such wobbling will result in a portion of the mass contacting the borehole wall to initiate backward whirl. As previously stated, once backward whirl is initiated it is self regenerative as the centrifugal force increases frictional contact of the mass external surface with the wall.

Figure 34:
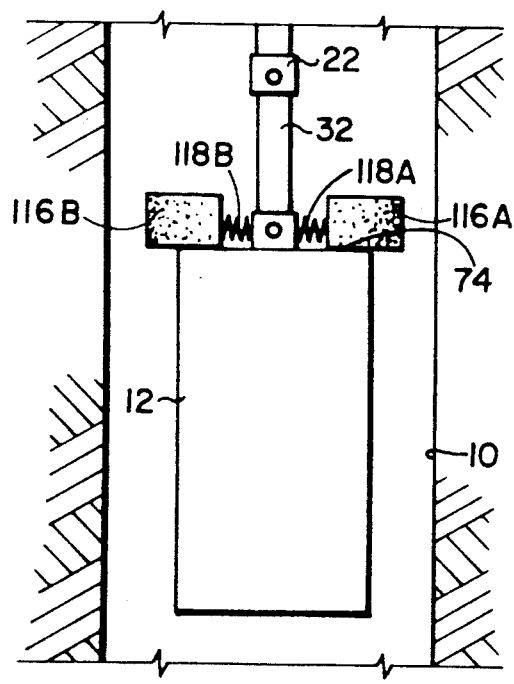
FIG. 34 is an elevation diagrammatic view of a mass supported in a borehole and in which the mass has displacable mechanical friction enhancing elements on the top thereof, the elements being urged outwardly for contact with the borehole sidewall.
Figure 35:
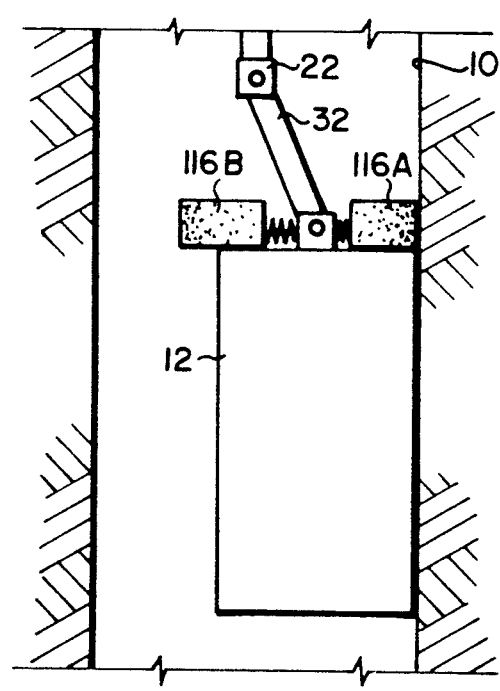
FIG. 35 is the embodiment of FIG. 34 as the mass is rotated. As the centrifugal force urges the mass to rotate against the borehole sidewall the frictional elements are displaced inwardly so as to permit full contact of the mass sidewall with the borehole.

FIGS. 34 and 35 show another means of initiating backward whirl. Mass 12 has at top 74 thereof a plurality (two being illustrated in the external elevational view) of frictional elements 116A and 116B. The elements 116A and 116B are affixed to slide inwardly and outwardly, that is, radially, with respect to the axis of rotation of the mass, or the frictional elements 116A and 116B may be affixed to hinge so that they can expand inwardly or outwardly relative to the mass. The elements are urged in their outward direction by means of springs 118A and 188B so that they extend beyond the external periphery of mass 112. The externally extending frictional elements readily engage the interior of borehole sidewall 10 as the mass is rotated to initiate backward whirl.

FIG. 35 shows the relationship of the elements when backward has been attained. The centrifugal force of the backward whirling mass forces it against borehole sidewall 10, displacing inwardly the frictional element contacting the wall so that the entire external surface of mass 12 engages the borehole wall. The basic concept of the arrangement of FIGS. 34 and 35 is the same as that of FIGS. 13 and 14 except that in FIGS. 13 and 14 an elastomeric member is employed, whereas in the embodiment of FIGS. 34 and 35 moveable structural elements are utilized to initiate backward whirl.

Figure 36:
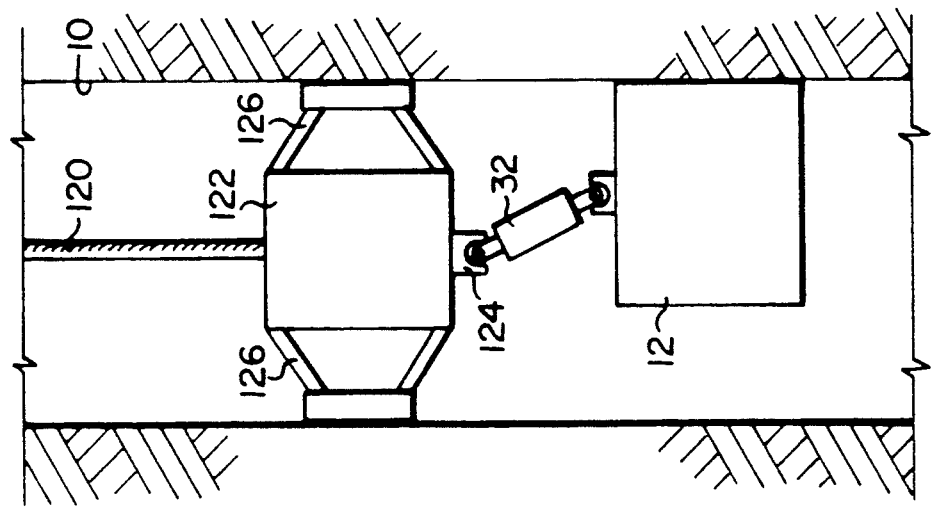
FIG. 36 discloses diagrammatically a method of practicing the invention for generating vibrational energy within a borehole in which the entire system can be positioned into and removed from the borehole, such as on a conventional wireline which can also be a hydraulic line.

As previously described a readily available means of backward whirling a mass in a borehole is by the use of rotational tubing extending from the earth's surface. While the use of tubing is a basic means of rotating a mass in a borehole, the problem with the use of tubing is that it is fairly expense and time consuming since tubing must be run into or removed from a borehole one length at a time, the length being threadably coupled to each other. An alternate arrangement is to run into a borehole from the earth's surface a mechanism to accomplish backward whirling of a mass wherein the whole mechanism is supported on a flexible medium, such as a conventional wireline that includes electrical conductors or a conventional wireline that includes also a hydraulic line. Since a wireline can be wound and unwound from a spool, insertion of the mechanism into or removal of it from a borehole is much more expedient and, therefore, less expensive than is the process of running a length of tubing in and out of a borehole. FIG. 36 shows diagrammatically how the system of this invention may be employed with a flexible line 120 that may be a steel cable providing the necessary strength for supporting the mechanism in combination with electrical conductors or in combination with a hydraulic line. Cable 120 is attached to a rotatory source 122, which can be a motor if the cable has conductors for supplying electrical energy or it can be a hydraulic motor if cable 120 has a hydraulic line as a part thereof. The rotatory source has a shaft 124 extending from the bottom providing rotational energy.

Extending from the rotary source 122 are arms 126, only two sets of which are shown in the elevational view. In the practical application of this concept at least three sets spaced apart would be required for centrally positioning the rotary source in borehole 10. The arms 126 are controllable by electrical conductors that form a part of flexible line 120 so that when the rotary source has been positioned at the selected depth an operator can, by controls from the earth's surface, apply electrical energy to extend the arms 126 lock the rotary source in a non-rotated and supported position within borehole 10.

After the rotary source is locked in position by separate control at the surface, the operator can apply electrical energy to rotary source 122 to rotate shaft 124 or supply hydraulic energy if the rotary source is a hydraulic motor. The rotation of shaft 122 is coupled by linkage 32 to mass 12 to cause it to rotate in the borehole and backward whirl to generate vibrational energy as previously described. The speed of shaft 124 can be varied to change the characteristics of the vibrational energy produced by the backward whirling mass such as for producing seismic signals having different frequency characteristics or for producing vibrational energy for other applications in the borehole.

Figure 37:
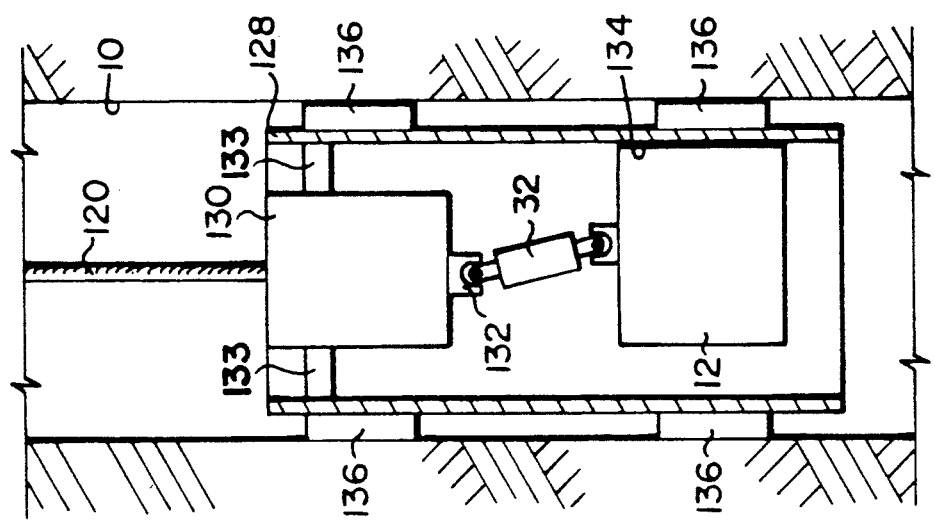
FIG. 37 shows another alternate embodiment of the invention in which the vibrational energy system can be positioned into and removed from a borehole by means of a wireline. In this embodiment a tubular housing is employed with controllable slips for engaging the borehole sidewall. Within the housing is a motor having a shaft extending therefrom connected by a linkage to a rotational mass. The mass rotates within the interior tubular housing to generate vibrational energy.

An alternate embodiment of the concept of FIG. 36 is shown diagrammatically in FIG. 37. In this embodiment a tubular housing 128 having an external diameter less than the diameter of borehole 10 is suspended by a cable 120, the cable providing both physical support and either electrical or hydraulic energy. Housing 128 has within it a rotary source or motor 130 having a shaft 132 extending therefrom connected by linkage 32 to mass 12. Motor 130 is supported within the housing such as by brackets 133 extending between the motor and the interior wall of housing 130. When energy is supplied to motor 130, whether electrical or hydraulic, shaft 132 rotates mass 12 to backward whirl within tubular housing 128, that is, mass 12 backward whirls in the mass interior circumferential surface 134 to generate vibrational energy.

Since the apparatus of FIG. 37 is self-contained, that is, since the rotary source 130 and rotating mass 12 are supported within housing 128 there would be no innate tendency for the housing itself to rotate when rotary source 130 is energized. Vibrational energy will be transmitted to the earth's structure surrounding the borehole by fluid that inevitably fills the borehole in which housing 128 is positioned. However, to more effectively transmit vibrational energy to the surrounding earth and to stabilize the housing 128 in position, the housing may be provided with external slips 136 that can be expanded or contracted. Expandable slips 136 are commonly employed in the petroleum industry. Slips 136 can be expanded or contracted by electrically operated controls actuated from the earth's surface or by hydraulic energy controlled from the earth's surface if cable 120 includes a hydraulic line.

Figure 38:
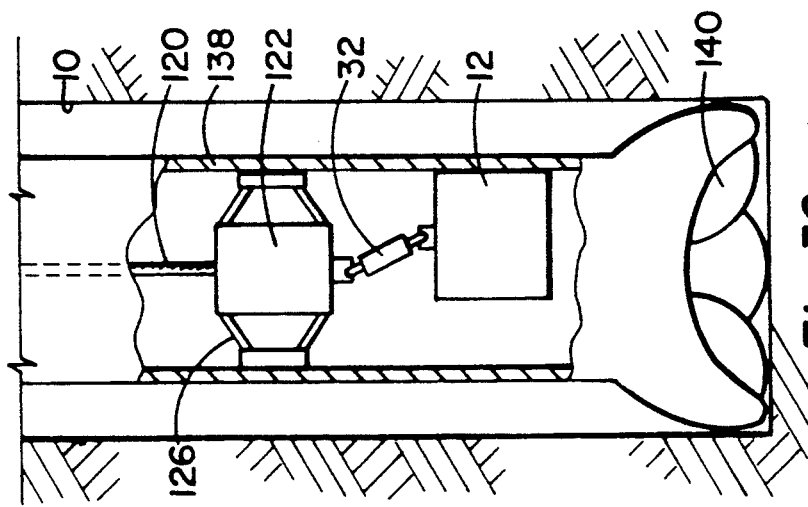
FIG. 38 shows the system of this invention in which the vibrational energy producing source is positionable into and removable from the interior of a drill string. This system is like that of FIG. 36 except that it is dimensioned to fit within the interior of the drill string so that the mass rotates in backward whirling action within the drill string interior to generate vibrational energy that may be used such as a seismic energy source.

The system of FIG. 36 can also be applied internally of a tubular member such as a drill string. FIG. 38 shows a drill string 138 extending from the earth's surface as may be employed to rotate bit 140 at the lower end of the drill string for use in drilling borehole 10. The mechanisms of FIGS. 36 that is, rotary source 122, linkage 32 and backward whirl mass 12 may be positioned into or removed from the interior of the drill string by cable 120, all in the manner previously described. The difference in the arrangement of FIG. 38 with that of FIG. 36 is that in FIG. 38 the components are substantially miniaturized as compared with that of FIG. 36, but the principle of operation is the same. The advantage of the system of FIG. 38 is that it can be run into a drill string for generating vibrational energy without the necessity of pulling the drill string out of the borehole to thereby save considerable time and expense. When, in the process of drilling a well information is required about the geological characteristics through which the bit is passing, such characteristics can be determined using seismic signals generated by means of the whirling mass with the drill string.

The embodiments of FIGS. 10 through 33 along with FIGS. 34 and 35 are illustrative of ways of initiating frictional engagement of a whirling mass within the interior of a borehole. FIG. 27 shows that the geometry of the mass can be changed, such as by making it hollow to change the characteristics of the whirling mass for specific applications. FIGS. 36 through 38 illustrate ways in which the system can be adapted for expeditiously placement in or removal from a borehole when the need for downhole vibrational energy exists.

Figure 40:
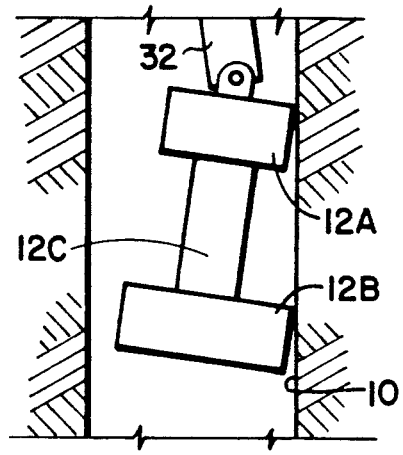
FIG. 40 shows an alternate embodiment of the invention in which the mass has a smaller diameter and a larger diameter portion integrally affixed to each other. Due to the difference in diameters, the portions of the mass backward whirl at different rates to thereby create a more complex vibrational energy pattern that is imparted to the borehole sidewall.

FIG. 40 shows an alternate embodiment of the invention in which the mass has a first portion 12A and a second portion 12B with the portions being of different diameters. Upper portion 12A is of smaller diameter than of lower portion 12B. The portions are integrally connected with an intermediate portion 12C. FIG. 40 is representative only as larger diameter portion 12B can be at the top with smaller diameter portion 12A at the bottom. In addition, rather than utilizing a reduced diameter connecting portion 12C the mass can be frustoconical in shape. The importance of the embodiment of FIG. 40 is to illustrate that the mass may have a different diameter in one portion than in the other so that the portions process at different rates of rotation as the mass backward whirls within borehole 10. This different rate of procession will cause the mass to wobble in the borehole as it is backward whirling in response to rotational torque supplied by flexible shaft 32.

In the embodiment of FIG. 40 more complex vibrational energy is generated by the rotating mass. At times the upper and lower portions of the mass contact the same vertical side of borehole 10 concurrently, as illustrated in FIG. 40, so that the applied force against the borehole wall is all in one direction. At a later time, caused by the different rates of procession of the backward whirling portions of the mass, the forces applied against the borehole sidewall will be opposite of each other, that is, wherein the smaller upper portion 12A contacts one side of the borehole wall while substantially the larger diameter portion 12B contacts the opposite side of the borehole wall so that the applied forces are in opposite directions.

The arrangement of FIG. 40 thereby creates a more complex vibrational energy source within the borehole that typically will be desirable only if a more complex vibrational energy source is desired for specific geophysical or other applications.

Figure 41:
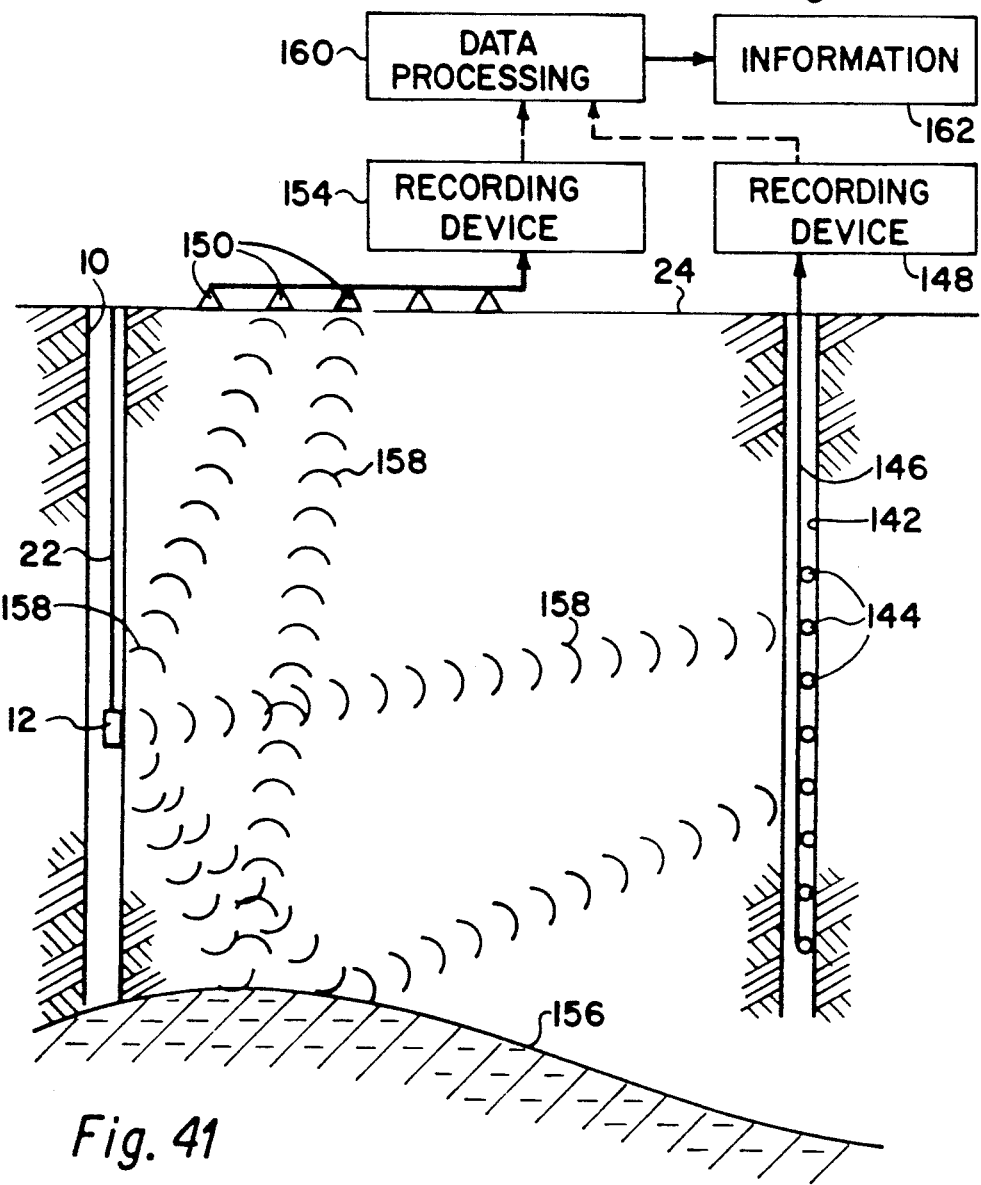
FIG. 41 is an elevational diagrammatic view of a borehole in the earth's surface having means for backward whirling a mass to generate vibrational energy in the borehole and showing a plurality of geophones positioned on the earth's surface and in an adjacent well borehole. This figure further shows representative seismic signals traveling from the backward whirling mass to the geophones, the energy signals being transmitted directly and by reflection from geological strata within the earth. The signals are received by the geophones and resulting electrical signals are conveyed to recording devices. The information on the recording devices can be subsequently analyzed, usually at a remote location where substantial computer facilities are available to obtain a determination of the characteristics of the earth's structure surrounding the borehole having the backward rotating mass therein.

FIG. 41 diagrammatically illustrates an application of the downhole vibrational energy source of this disclosure. The backward whirling mass 12 is illustrated within borehole 10 for operation as has been previously described with reference to FIGS. 1-40. In the arrangement of FIG. 41 there is an offset borehole 142. Positioned within this offset borehole are a plurality of spaced apart geophones 144 suspended on a cable 146 that, above the earth's surface 24, is connected to a recording device 148.

In addition, there is positioned on the earth's surface 24 a plurality of surface geophones 150, spaced apart from each other, and connected by a cable 152 to a recording device 154.

The earth has subsurface strata of varying densities, a strata being indicated by the numeral 156. It is well known that when an energy wave encounters a change in density that a portion of the energy is reflected. Vibrational energy generated by the backward whirling mass 12 within borehole 10 is a source of seismic energy which causes radiation of seismic signals 158. These seismic signals progress in the earth in all directions away from the energy source, only representative directions being indicated in FIG. 41. Some of the seismic signals are transmitted directly in the direction toward the secondary borehole 142 and are received by geophones 144 positioned therein. Other seismic signals are transmitted directly in the direction toward the earth's surface 24 and are received by the surface mounted geophones 150. Still other seismic signals encounter a strata exemplified by 156 and are reflected back both toward the secondary borehole and the earth's surface. Thus, as a consequence of the generation of vibrational energy, seismic signals are generated in the borehole which can be received by geophones in a variety of ways, including the ways illustrated in FIG. 41. The received signals are recorded on the recording devices 148 and 154. The information made available by the recording devices 148 and 154, which can be in the form of information recorded on magnetic tape, magnetic discs or the like, can then be processed to provide valuable information as to the earth's structure in the area surrounding borehole 10.

Data collected in the recording devices 148 and 154, or either of them, is conveyed to a data processing facility 160 which is usually remotely located. The data processing facility 160 typically employs a sophisticated computer system utilizing a sophisticated program. The data which is obtained by reception of the seismic signals generated by the whirling mass is correlated and analyzed in the data processing facility 160 to produce, as an output, information at 162 that enables a geophysicists to understand at least some of the characteristics of the earth's structure adjacent to borehole 10. The data processing equipment 160 may be located far removed from the borehole 10, such as in a completely different part of the world.

The arrangement of FIG. 41 is merely exemplary of one application of the vibrational energy source created by a backward whirling mass in a borehole.

Figures 42, 43:
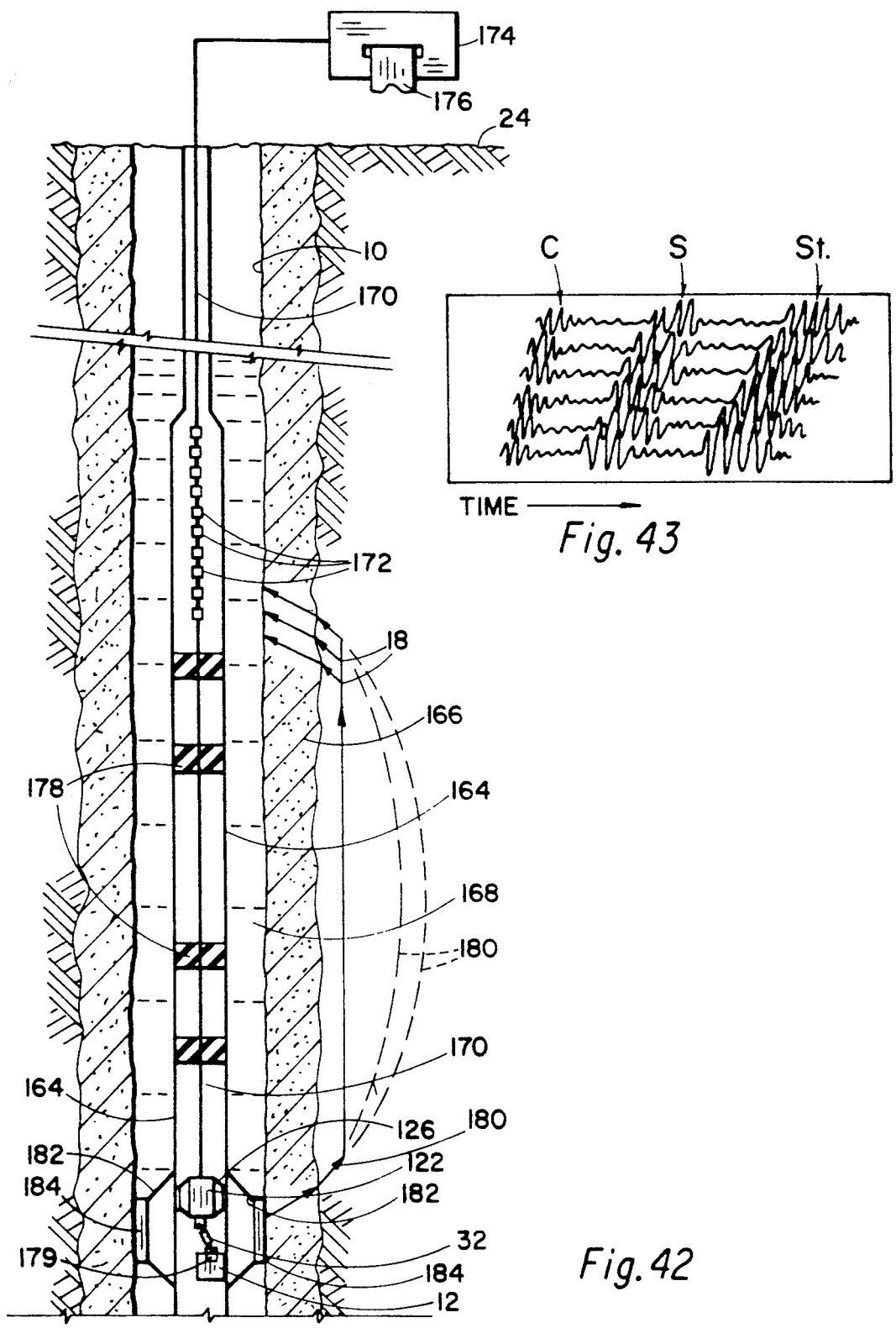
FIG. 42 is an elevational diagrammatic view of a borehole extending from the earth's surface with an instrument housing positioned within the borehole. A backward whirling mass is supported within the instrument housing for generating a high intensity seismic signal. Positioned within the casing above the backward whirling mass are a series of seismic detectors, such as geophones. By means of a cable extending to the earth's surface the geophones are connected to a receiver that provides a record. The path of sonic energy travelling in the earth adjacent the borehole is illustrated by arrows.
FIG. 43 is a fragmentary representation of the record of seismic signals received by six geophones positioned as in FIG. 42, illustrating three types of seismic signals detected by the geophones, that is, compressional waves, shear waves, and Stoneley waves.

FIG. 41 illustrates the use of the backward whirling mass 12 in a borehole 10 as a seismic energy source. FIG. 42 shows an alternate arrangement wherein the backward whirling mass is located within an instrument housing. There are some advantages in locating backward whirling mass 12 in a protective housing rather than in the borehole itself for generating seismic energy. When a mass is rotated within the borehole itself, there is always the possibility that the integrity of the borehole will be impaired. By placement of the backward whirling mass within a tubular member, such as shown in FIGS. 37 and 38, this potential problem is eliminated. FIG. 37 shows a short length of a cylindrical housing 128 that is supported on a wireline 120 within a borehole, while FIG. 38 shows mounting the backward whirling mass within a drill string 138. FIG. 42 shows an arrangement wherein the backward whirling mass is supported within an instrumentation housing 164, which may or may not be a drill string.

A backward whirling mass seismic energy source positioned within a housing in a borehole can be used for a variety of different types of seismic investigations. One particular application is the use of the rotating mass seismic source for vertical seismic profile work in which both the signal generator and the signal receivers are placed downhole. This arrangement eliminates the problems usually associated with placing geophones on the earth's surface, such as is typically employed in seismic exploration, since placing both the signal source and the geophones downhole eliminates the distortion imposed by the earth's low velocity surface layer.

Crosswell tomography, in which a downhole backward whirling mass is used to generate seismic signals that are detected in geophones positioned in an offset borehole, can be used to provide significant geophysical information as discussed with reference to FIG. 41. Crosswell tomography has heretofore been employed only in very limited commercially significant ways because of the limitations on the amount of downhole power available for creation of seismic signals. This limitation is overcome by the use of a whirling mass as the seismic signal generator.

Figure 44:
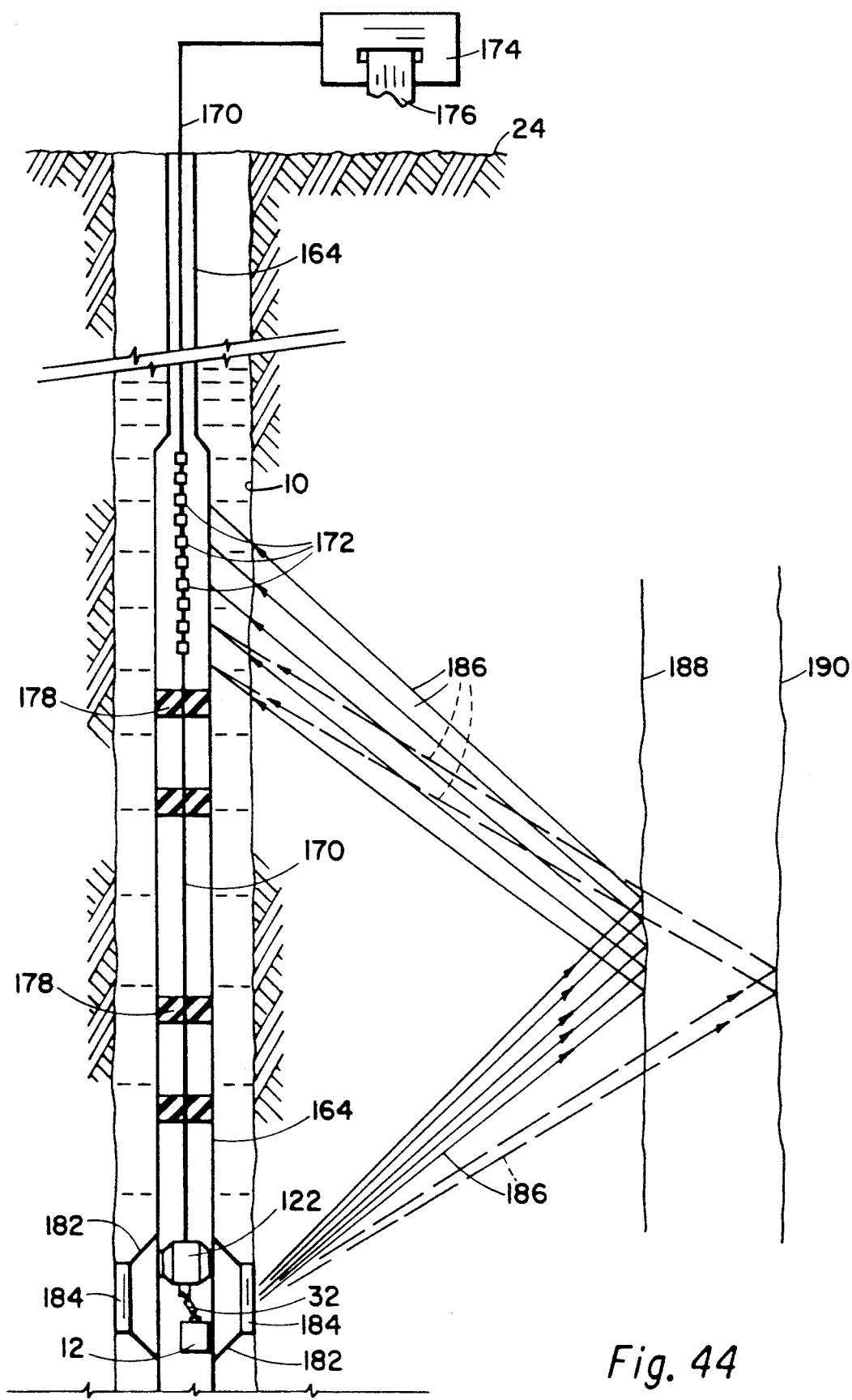
FIG. 44 is a diagrammatic representation, as in FIG. 42, of a borehole having an instrument housing therein with a backward whirling mass and a plurality of geophones positioned within the instrument housing and showing the arrangement wherein seismic signals generated by the backward whirling mass are reflected from adjacent geological structures that are parallel to the borehole.
Figure 47:
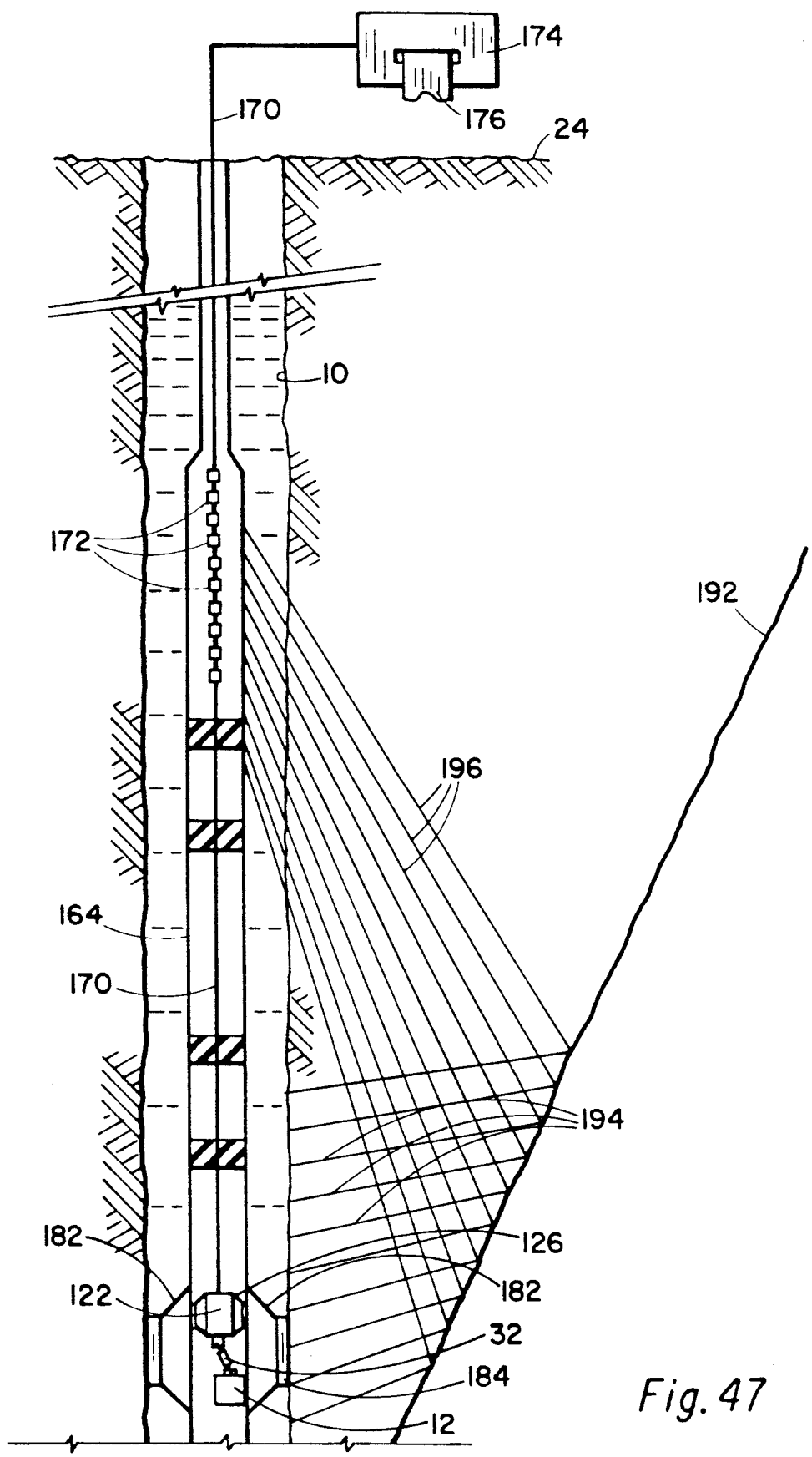
FIG. 47 is a diagrammatic representation of a borehole, as in FIGS. 42 and 44, with instrumentation having a backward whirling mass used as a seismic signal generator functioning within the interior of the instrument housing and showing, adjacent the borehole, a geological fracture that is in a plane extending at an acute angle with respect to the borehole axis and showing diagrammatically the path of travel of seismic signals as the instrumentation is moved within the borehole.

The high energy downhole seismic signal generating source of this disclosure is particularly applicable for use with Downhole Vertical Seismic Profile (DVSP) geophysical investigation. Three ways in which DVSP may be employed are illustrated in FIGS. 42, 44, and 47. These figures are not intended to illustrate all of the applications of DVSP but are representative of the various ways in which DVSP may be employed to enable a geophysicist to gain substantial information as to the earth's structure adjacent a borehole.

FIG. 42 is particularly illustrative of Ultra-Long Spaced Acoustic Log (ULSAL) geophysical exploration. FIG. 42 shows a borehole 10 extending from the earth's surface 24. Surrounding the borehole in the first few inches of the earth's structure is a "damaged zone" indicated by the numeral 166—that is, a zone that may extend in thickness from a fraction of an inch to several inches surrounding borehole 10. This area is called a "damaged zone" since it is an area that has typically been penetrated by drilling mud 168 that is used in drilling a well. Drilling mud 168 is a heavy liquid that is used for circulation down through a drill string, out the drill bit and back up the annular area between the well borehole and the drill string. Drilling mud 168 is utilized for several purposes, including cooling of the drill bit, returning cuttings generated by the drill bit to the earth's surface, and applying a hydrostatic pressure in the borehole to prevent the possibility of a blowout in the event a very high pressure oil and/or gas zone is encountered.

FIG. 42 shows an instrumentation package having a tubular housing 164, the housing being supported by a tubing string extending from the earth's surface. The instrument housing 164 can be supported by an electrical cable extending to the earth's surface. Positioned within housing 164 is a motor 122 connected by a flexible coupling 32 to a backward whirling mass 12, the motor, flexible coupling and rotary mass having been previously described in detail. By means of arms 126 extending from motor 122 it is anchored within housing 164. Arms 126 are retractable so that motor 122 can be positioned within housing 164 and removed from it, the use of retractable arms 126 having been previously described with reference to FIGS. 36 and 38.

The function of arms 126 is to keep the motor in a stable, non-rotary position within the housing and to resist reactionary torque when the motor is energized to backward whirl mass 12.

A cable 170 extends from instrumentation housing 164 to the earth's surface. Cable 170 can be employed for a variety of purposes. When motor 122 is electrically driven, electrical energy may be supplied from the earth's surface by way of cable 170. Further, cable 170 may be employed to provide signals, such as for extension or retraction of arms 126. In addition, the cable may be used to control the rate of backward whirl of mass 12. As previously stated, an accelerometer may be employed within mass 12 and the signal thereof transmitted by way of cable 170 to the earth's surface.

Positioned within housing 164, and spaced from backward whirling mass 12, are a series of spaced apart geophones 172. Sonic energy passes from the earth surrounding borehole 10, through liquid within annular area 168 within the borehole, and through housing 164 to geophones 172. Cable 170 carries signals from each of the geophones 172 to the earth's surface where it connects with a recording device 174. Recording device 174 includes circuitry for receiving, amplifying, and treating electrical signals generated by geophones 172 and for providing an output in the form of a record that can be recorded in a variety of ways, including on discs, magnetic tape, solid state memory or the like, and the information collected can be graphically displayed, such as on a chart 176. The production of chart 176 or other forms of readout to provide information in human useable form may take place in an area far remote from borehole 10 and after the information gathered from cable 170 has been treated by sophisticated circuitry employing applicable software programs by which the information from geophones 172 is manipulated in a manner to reduce background and extraneous noise.

The sonic signals generated by backward whirling mass 12 will inevitably travel up housing 164 directly without first traveling through the earth. In order to minimize the strength of these direct signals, which by and large are considered noise and which must be eliminated in the process of using the collected data to provide information about the earth's structure, decouplers 178 are employed. Such decouplers may be in the form of rubber blocks that, due to their elasticity tend to absorb sonic energy as it moves up the interior of the housing. A number of such decouplers 178 may be employed as necessary. Further, an accelerometer 179 may be placed in the mass and a signal from accelerometer 179 conveyed by cable 170 to instrumentation 174 where the signal is used to cancel the effect of directly coupled sonic signals, as well as for timing purposes.

Travel of sonic energy in the earth's formation adjacent borehole 10 is indicated by arrows 180. Sonic signals travel, in the ULSAL application, adjacent the borehole. This characteristic enables a geophysicist to gain knowledge as to the characteristic of the formation through which the borehole passes.

The sonic energy detected by geophones 172 as a result of whirling mass 12 will be in three basic forms, that is, as compressional waves, as shear waves, and as Stoneley waves, sometimes known as tube waves. FIG. 43 is an illustration of the typical signals received from six of the geophones 172. The signals are offset due to spacing between the geophones. The first group of signals, indicated by the letter "C", are compressional wave signals, the fastest traveling signals. Next, are the shear wave signals, indicated by the letter "S", and the third group of signals are the Stoneley or tube wave signals indicated by "ST".

FIG. 43 shows a short segment of the signals that would be received by six geophones 172 at a single elevational location of instrument 164. In the process of deriving information as to the characteristic of the earth's formation surrounding borehole 10 instrument housing 164 will be moved in the borehole while sonic signals are being generated utilizing rotational mass 12 and the sonic energy received and recorded by means by geophones 172 and instrumentation 174.

As previously indicated, borehole 10 is filled with a liquid in annular area 168, such as drilling mud, that has the ability to transmit seismic signals. As shown in FIG. 42 the transmission of seismic signals generated by whirling mass 12 can be augmented by the use of pads 184 that engage the sidewall of borehole 10. Arms 182 can be retracted or extended, such as by means of signals supplied by cable 170, or may be secured by spring tension allowing pads 184 to slide within borehole 10. The arms and pads can be arranged to permit movement of the housing within the borehole while serving to augment the transmission of sonic energy from the housing as generated by rotating mass 12 to the earth's structure.

The spacing between the seismic source in the form of rotating mass 12 and geophones 172 may be from a few feet to thousands of feet. In ULSAL seismic exploration a typical spacing is in tens of feet, when the basic objective is to understand geology of the area immediately surrounding borehole 10. Depending on the spacing between the seismic source and the geophones, the depth of investigation may vary from one inch or less to a few feet.

The advantages achieved by a high powered, high intensity seismic source attained by whirling mass 12 introduces a number of opportunities not heretofore available in this type of seismic exploration. Long spacing, that is, such as from 50 to 100 feet between the seismic source and the geophone, allows the effective separation of the different propagation modes (compressional, shear and Stoneley) of the refracted signal. Shear velocity is critical information in calculating formation strength. In hard rocks, shear velocity is derivable from conventional long spaced sonic tools. In soft sands, in which the objective is to predict sand production, conventional tools are unable to measure the shear signal because it arrives later than the direct and Stoneley waves.

The use of the high energy source available because of the ultra high acoustical energy from rotating mass 12 eliminates the problem previously encountered in efforts to produce this type of log.

Further, the deep penetration which is achieved utilizing the high sonic energy backward whirling mass 12 allows bypassing damaged zone 166 surrounding the borehole and the effects of hole caving. Thus, the high sonic energy signal available opens up increased opportunities for the use of ULSAL seismic exploration.

Rotary source 122 can be electrically activated, as previously described, or it can be hydraulically activated by fluid pumped from the earth's surface.

Referring to FIG. 44, another application of the arrangement as has been discussed with reference to FIG. 42 is illustrated. In this illustration, sonic signals emanating from the seismic energy source provided by whirling mass 12 are indicated by the numeral 186. These signals travel in a more radially outward direction. FIG. 44 shows geological structures 188 and 190. These may be subvertical fractures that are essentially parallel to but spaced from borehole 10. In addition, the geological features 188 and 190 may represent fault faces, reef fronts, salt domes, and so forth. While borehole 10 is shown vertically in FIG. 44, the illustrated portion may be inclined at an angle relative to the vertical and, in fact, the illustrated portion may be horizontal with respect to the earth's surface 24. In which case, the vertical features 188 and 190 may represent the top or bottom surfaces of a reservoir in which horizontal drilling is intended. Knowing the location with respect to the borehole of the upper and lower boundary of a producing geological formation can be exceedingly valuable information to oil companies drilling horizontal wells. Due to the large sonic energy available from rotating mass 12, the reflections of seismic signals 186 that pass from the seismic source to reflect from geological features 188 and 190 and back to geophone 172 make possible the observance of geological features at further spacing from borehole 10 than has previously been possible.

Figure 45:
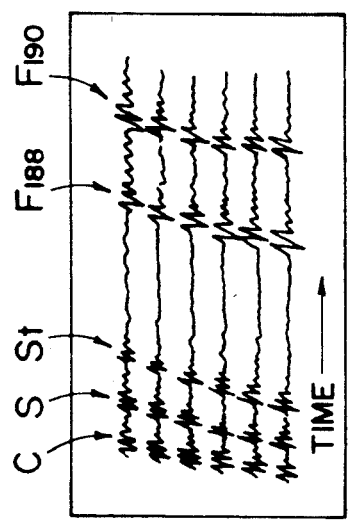
FIG. 45 is a diagrammatic representation of signals received from six of the geophones while the backward whirling mass is actuated at one elevational position in the instrument housing showing reflections from the vertical geological structures, such as fractures or discontinuities.

FIG. 45 shows signals received by six geophones, in the arrangement of FIG. 44, with the instrument package 164 at a fixed location in the borehole. Compressional wave signals are indicated by the letter "C", shear wave signals by the letter "S" and Stoneley wave signals by the letters "ST". Inclination of the signals are due to the spacing between geophones 172. The compressional, shear and Stoneley wave signals are those which travel substantially parallel to borehole 10 as discussed with reference to FIG. 42. The reflection from geological feature 188 are identified by "$F_{188}$" and those from feature 190 by "$F_{190}$". These reflective signals, which arrive subsequently to the ULSAL signals "C", "S" and "ST", provide information to a seismologist to enable him or her to reach definitive conclusions as to the earth's structure in the area of borehole 10.

Figure 46:
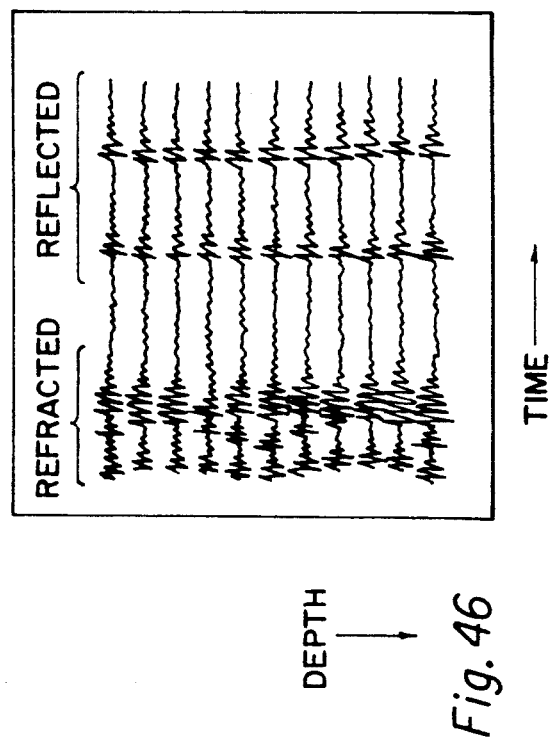
FIG. 46 is a diagrammatic representation of seismic signals received from a single geophone as the instrumentation, including the backward whirling mass is moved in the borehole showing the signals at different depths as received by the single geophone.

FIG. 46 is a chart typical of that which would be produced in the arrangement of FIG. 44 showing a trace produced by a single geophone as the instrument housing 164 is moved in borehole 10. Thus, each trace is at different depth. The compressional, shear and Stoneley waves occur first and are identified as the refracted waves. The fact that the reflected waves stay at about the same spacing in time as the instrumentation is moved enables the seismologist to know that the geological features 188 and 190 causing such reflections extend parallel to the borehole.

FIG. 47 shows the same geophysical prospecting system as in FIGS. 42 and 44 in a circumstance wherein a geological feature, such as a fracture 192, extends at an acute angle with respect to borehole 10. As previously indicated, borehole 10 is not necessarily vertical as illustrated but might be inclined with respect to the earth's surface 24 or even parallel to the earth's surface. In FIG. 47 sonic waves 194 are shown emanating from borehole sidewall as would occur when instrument housing 164 is moved in the borehole. Each of the indicated sonic waves 194 is indicative of sonic wave propagation at a different position of instrumentation housing 164. The reflected waves, indicated by the numeral 196, are indicative of a different spacing of the instrument housing, waves 196 representing those reflected from fracture 192.

Figure 48:
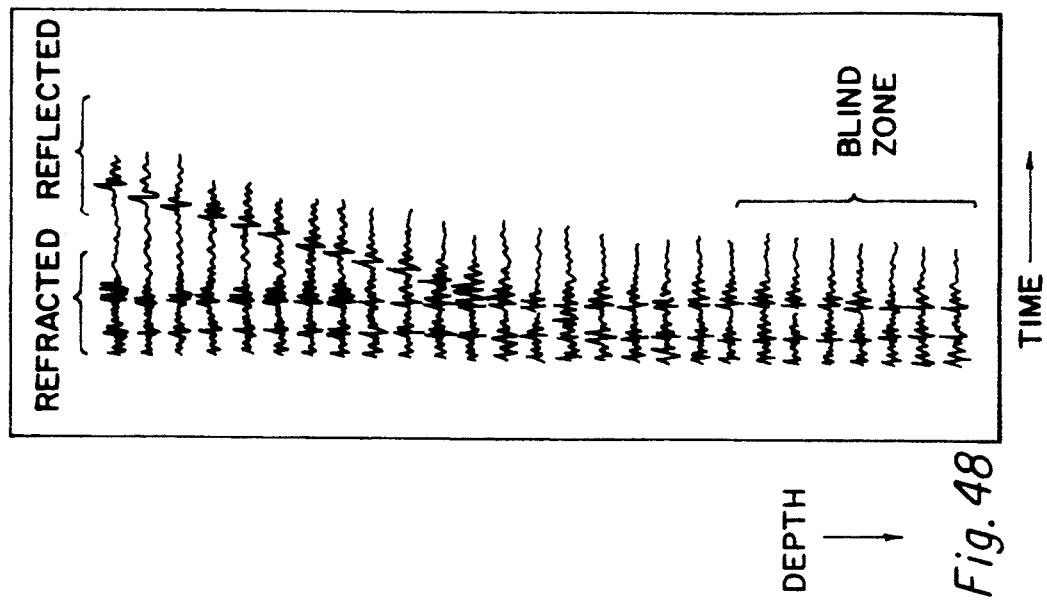
FIG. 48 is a representation of seismic signals detected by a single geophone as the instrumentation of FIG. 47 is moved within the borehole.

FIG. 48 shows illustrations of the energy detected by a single geophone as the instrument housing is moved in the borehole. The first waves received are the refracted waves that travel substantially parallel to the borehole as previously described. Later received waves are the reflected waves, that is, sonic energy reflected from fault 192. Note that the reflected waves merge with the refracted waves as the instrument housing moves within the borehole toward the point of intersection of the borehole with fracture 192. Below the fracture the sonic waves are reflected downwardly and, thus, not back toward geophones 172, thus producing the blind zone as indicated.

The examples of the application of the high energy seismic source achievable by rotating mass 12 as shown in FIGS. 42, 44 and 47 are exemplary of the way this seismic energy source may be used, particularly when used within a metallic housing such as instrument housing 164 and when geophones are also received within the instrument housing. These examples are not intended to be exhaustive but only indicative of the applications that can be made utilizing the rotating mass seismic energy source, and particularly where the extremely high acoustic signal level achievable by a backward whirling mass makes it possible to gather geophysical data from a borehole that has not previously been feasible due to the lack of a sonic energy source with sufficient intensity. FIGS. 42, 42 and 47 illustrate the use of a backward whirling mass in an instrument housing within an open borehole. These methods can also be practiced in a cased borehole or wherein the backward whirling mass operates with a casing in a borehole rather than within an instrument housing.

FIGS. 1-48 show various methods of the use of a backward whirling mass in a borehole, or in a casing or other tubular member in a borehole, to generate vibrational energy within the borehole. FIGS. 41-48 disclose methods of utilizing such vibrational energy in the form of sonic energy for geophysical investigation of the earth's structure surrounding and adjacent to a borehole in the earth. FIGS. 49-52 are illustrative of the application of high level vibrational energy in a borehole for other than sonic/geophysical applications. In FIGS. 49-52 a backward whirling mass is employed to produce high level vibrational energy in applications wherein such vibrational energy can be used in ways to improve the extraction of hydrocarbons from subterranean formations.

Referring first to FIG. 49, the lower portion of a borehole 200 is shown, the borehole extending from the earth's surface. Positioned within the borehole is a casing 202, usually of steel. Between the exterior of casing 202 and borehole 200 is an annulus 204 filled with a liquid or pumpable cement slurry. In most oil and gas wells it is necessary to anchor casing 202 in borehole 200 to seal annular area 204 against passage of oil, gas, or water up or down through the borehole. For this purpose, it is frequently necessary, and in fact universally necessary, that at least portions of the casing in a borehole be cemented in position. For this purpose, a liquid cement slurry is forced downwardly through the interior of casing 202. The cement slurry passes out the lower end 206 of the casing and rises upwardly within annulus 204. The cement slurry is followed by a water wash to remove the cement slurry from the interior of casing 202. In normal cementing operations a cementing float shoe (not shown) is secured to lower end 206 of the casing to prevent the cement from re-entering the casing.

It is important that the cement be fully filled and consolidated in annulus 204 to firmly seal the casing with respect to the borehole and to ensure that no leakage of oil, gas or water can take place longitudinally within this annular area.

Several hours are required before the liquid cement slurry "sets up" or develops sufficient strength to become an effective seal. During this time the hydrostatic pressure of the setting cement column must prevent the fluids from permeable formation zones entering the well bore to contaminate and disturb the cement setting process. In some cases during the setting process the cement develops a gel strength or "false strength" which prevents effective application of hydrostatic pressure to the permeable zone. This may allow formation fluids to enter the setting cement slurry contaminating the cement and also leaving undesirable communication channels after the cement has set up. This is known in the industry as the "gas leakage" problem.

In drilling operations drilling mud is passed downwardly through the interior of a drill string, out through a drill bit and back to the earth's surface through the annular area outside the drill string. The drill string is then removed and casing 202 inserted. Thus, borehole 200 is typically filled with drilling mud prior to the cementing action. The intent in forcing a cement slurry down through the casing and out lower end 206 thereof is to completely displace the drilling mud within annulus 204 so that a secure leak proof cement seal is obtained around the casing. Unfortunately, sometimes some of the cement slurry does not uniformly displace the drilling mud. If any drilling mud is entrapped in the cement slurry as it rises upwardly within the borehole, a defective cement job can occur.

To improve the effectiveness of the cement job FIG. 49 shows a tubing 208 which extends from the earth's surface to within the interior of casing 202. Attached to the lower end of tubing 208 is an anchor housing 210 that supports hydraulically displacable anchors 212. A passageway 214 extends through anchor housing 210 and communicates with a hydraulic pressure regulator 216. Fluid passes through the hydraulic pressure regulator and into a fluid motor 218 having a cavity 220 therethrough, the cavity extending out the lower end 218A of the motor. Rotatably positioned within cavity 220 is a rotor 222 that provides, at the lower end thereof, an output drive shaft 224. A flexible coupling 226 attaches a mass 228 to the drive shaft.

After the cement in annulus 204 has been forced into position, followed by a water or mud wash which displaces the cement slurry out of the interior of casing 202, the mechanism mounted on the lower end of tubing 208 is positioned in the borehole. Fluid, such as water, is forced down the interior of tubing 208. The pressure within tubing 208 is controlled by pressure regulator 216 to cause a back pressure above the regulator. This back pressure is applied to housing 210 urging anchors 212 outwardly by hydraulic force into contact with the interior wall of casing 202, thus, anchoring fluid motor 218 in position. Further fluid pressure displaces the hydraulic pressure regulator 216, permitting fluid to flow down through motor annulus 220 rotating rotor 222 and thereby drive shaft 224 to rotate mass 228 about its rotational axis. As has heretofore been described with reference to FIGS. 1-40 the rotation of mass 228 about its cylindrical axis will cause, as the mass frictionally contacts the interior of casing 202, it to backward whirl. This backward whirling mass sets up a centrifugal force. The mass whirls in a direction opposite the direction of rotation of the mass and the centrifugal force causes vibration of the casing. Depending upon the weight of the mass and the rapidity at which it is rotated, substantial vibrational energy is imparted to casing 202. This vibrational energy serves to consolidate the cement in annulus 204. Most particularly, the vibration of casing 202 by the backward whirling mass causing the cement slurry to behave like a liquid rather than a gelled movement-resistive mass for a longer period of time in the process of solidification of the cement slurry. The vibration of the casing breaks the gel strength of the cement slurry and permits it to maintain hydrostatic pressure against permeable zones. If sufficient hydrostatic pressure is not maintained, formation hydrocarbons, such as gas, may move into the annulus and create undesirable communication after the cement has set.

In some situations the pressure drop due to the water passing through the motor annulus 220 may be sufficient such that pressure regulator 216 is not needed. Additionally, if tubing 208 is sufficiently rigid to resist the torque of fluid motor 218, anchors 212 may not be needed.

Instead of a hydraulically actuated motor 218, the method of improving the consolidation of cement in a well annulus can be employed utilizing an electric motor such as described with reference to FIGS. 36 and 38. In this arrangement, the electric motor is moved into and out of position in the casing by means of an electrical cable, and extendable arms may be employed to anchor the motor to the interior of the casing that serve the same function as anchors 212. If desired, the electric motor could be run on tubing 208 with the power cable contained within the tubing. This might be particularly necessary in highly deviated holes where the electric motor and vibrational device would have to be "pushed" into the hole. It might also be desirable to use tubing as a means to circulate a selected treating fluid to improve effectiveness of perforation cleaning operations. If tubing is used to move the electric motor and is sufficiently rigid to resist the torque of the motor, the extendable anchoring arms would not be needed.

To achieve backward whirling action it is necessary that rotating mass 228 has frictional contact with the interior of the casing. FIGS. 7 through 35 show various techniques that can be employed for securing the frictional contact between the rotating mass and the interior of the casing to cause it to backward whirl to achieve the improved cement operations as illustrated in FIG. 49.

An alternative interpretation of FIG. 49 is that casing string 202 has become stuck while attempting to position the same within the borehole. String 202 could also be interpreted as any tubular string within a borehole. Tubular strings can become stuck for a number of reasons, including differential sticking, key seating, or for a variety of a number of other mechanisms. In some cases vibration may be beneficial in freeing the stuck tubular member.

FIG. 49 shows how a backwards whirling mass 228 can be used to impart vibrational energy to the stuck member. The rotational energy required to power the whirling mass 228 could be provided by either an electric or hydraulic motor as described previously.

FIG. 50 shows a casing 202 cemented in a borehole 200 as previously described and shows the casing extending into a hydrocarbon producing formation 230. After the casing has been cemented in place in the borehole it is necessary that communication be established between the producing formation 230 and the interior of the casing. For this purpose, it is a common expedient in the petroleum industry to form perforations 232 in the casing. The perforations are typically formed by firing a perforating gun positioned within the casing after cementing has been completed. The perforating gun forms perforations 232 in the casing. Perforation channels 234 are simultaneously formed through the cement in annulus 204 and the perforation channels extend into producing formation 230. These perforations and perforation channels thus establish passageways for the flow of oil and/or gas from the producing formation 230 into casing 202. If the subterranean formation pressure is sufficiently high the flow will force the produced hydrocarbons to the earth's surface. This is known as a "flowing well" if liquids are primary produced or if formation 230 contains primary gas, the gas is forced to the earth's surface. In some instances, the subterranean pressure is not sufficient to force produced crude oil to the earth's surface, and after perforation a pump or other means of artificial lift may be positioned in the casing.

Most producing formations 230 are in the form of finely compacted sands in which the oil and/or gas are entrapped, that is, an "oil pool" as commonly referred to actually seldom means a cavity filled with liquid or gas but a porous permeable rock structure through which oil and/or gas can migrate. In some instances, the rock structure is poorly consolidated and is referred to as "unconsolidated sand". Even in consolidated formations some displacement of sand can occur, and sand and debris can ultimately fill perforations 232 and perforation channels 234 to thereby deteriorate the communication between the producing formation and the interior of the casing. In some situations, scale from the produced formation water, or hydrocarbon solids from the produced formation oil deposited in the perforations or in the permeable rock structure near the well can also deteriorate the communication. In other situations a well may be "killed" or filled with a liquid to contain the formation pressure while certain remedial operations are done. Solids from the killing liquid may also plug the perforations.

FIG. 50 shows a method of treating the well to help dislodge debris or compacted sand or other material that has filled some or all of perforations 232 and perforation channels 234. Hydraulically actuated motor 218 having mass 228 suspended therefrom is positioned in the well as previously described. When fluid is forced down through the hydraulic motor to rapidly rotate mass 228 and friction is established between the mass exterior and the casing interior, the mass begins to backward whirl creating a high energy level vibration of the casing. This vibration is transferred by the cement in annulus 204 to the producing formation 230 to shake up and dislodge debris and/or sand which may have compacted within the perforations and perforation channels. In some cases the effectiveness of the vibrational energy may be enhanced if the fluid used to operate the motor is of sufficiently low density to cause the formation fluid to move into the well bore creating additional scouring while the vibration energy is being applied. In other cases the circulated fluid could be selected to dissolve or disperse acid soluble materials or hydrocarbon soluble materials obstructing communication periodically changing the density of circulating fluid to create a surging effect might also be beneficial. By removal of debris and/or sand from the perforations and perforation channels, improved communication with the producing formation is reestablished and, consequently, increased production of the well can be achieved. Again, pressure regulator 216 and anchor 212 may not be required in certain situations described previously, and hydraulic motor 218 could be replaced by an electrical powered motor in certain situations, and the electric motor could be run on tubing with the power cable contained within the tubing.

Figure 51:
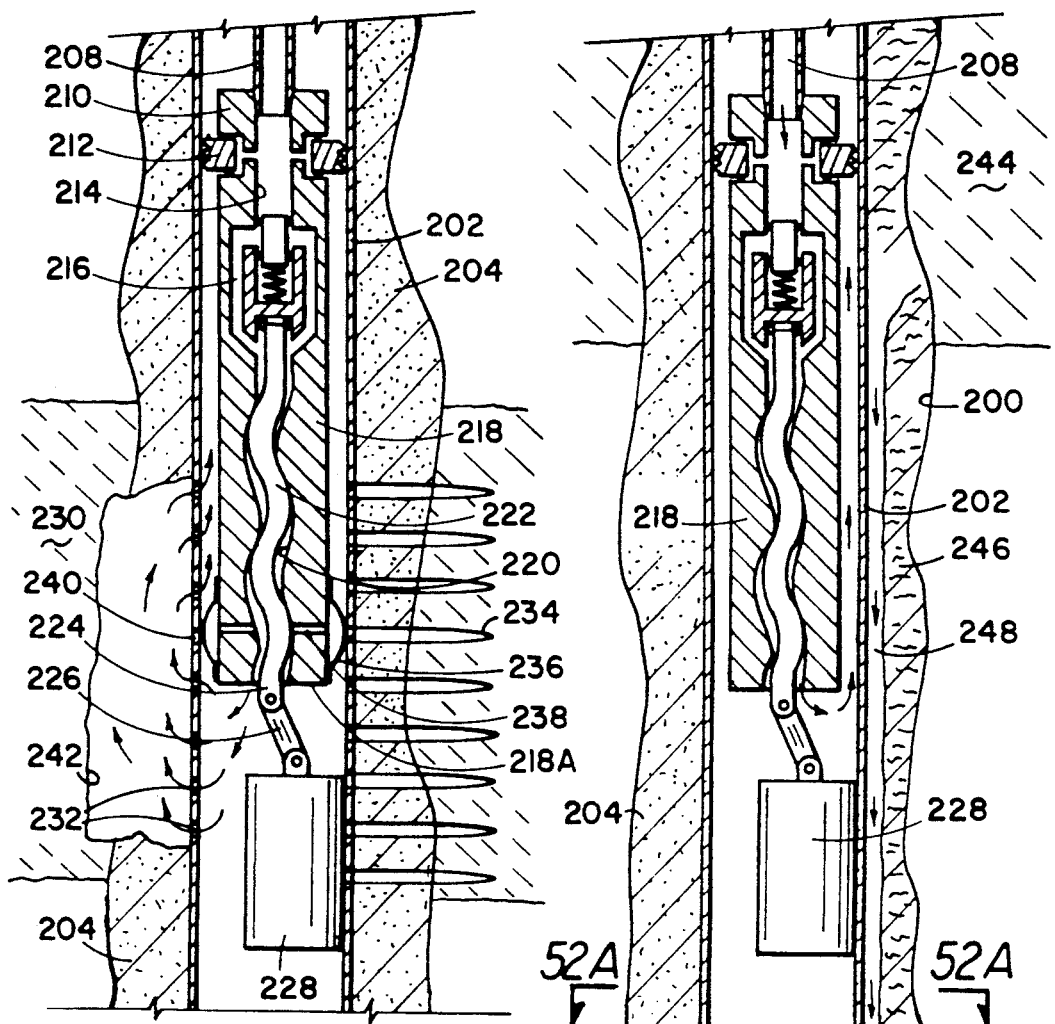
FIG. 51 is a cross-sectional elevational view of the lower portion of a borehole with a casing therein and with perforations in the wall of the casing extending through cement that secures the casing in the borehole and into the formation as in FIG. 50 but showing a different arrangement in which a packer is positioned in the casing intermediate the upper and lower boundary of the area having the perforations therein to separate the perforations into lower perforations and upper perforations and showing a method of circulating fluid through the lower perforations into the producing formation to create a cavity by washing action in the producing formation, and showing the use of a backward whirling mass to augment the creation of the cavity. The right-hand side shows the perforation as they normally appear before washing action takes place and the left-hand side shows the effect of forming a cavity by washing action.

FIG. 51 shows a slightly alternate arrangement of the method exemplified in FIG. 50. In this Figure, there is affixed to the lower end of fluid motor 218 an inflatable packer 236. Passageways 238 extend through the housing communicating motor cavity 220 with the interior of expandable packer 236. Perforations 232 formed in casing 202 have a midpoint 240 or division point, that is a point along the casing wherein some of the perforations are beyond the midpoint and some are forward of the midpoint as measured from the earth's surface. In the illustration of FIG. 51, half of the perforations are below midpoint 240 since the borehole and casing are shown in what appears to be a generally vertical orientation. It must be remembered that borehole 200 and casing 202 are not necessarily vertical as illustrated in FIGS. 49-52, as the borehole may extend at an angle relative to the earth's surface or even horizontally with respect to the earth's surface. In any event, in FIG. 51 some of the perforations are beyond midpoint 240 and some are forward of midpoint 240. When hydraulic fluid is forced down the interior of tubing 208 to, first, anchor hydraulic motor 218 in position as previously described and to flow through motor cavity 220 to rotate rotor 222, the fluid pressure is applied through passageways 238 to the interior of expandable packer 236. This means that the fluid that exits beyond lower end 218A of the motor housing can pass upwardly in the annular area between the motor housing and the casing only by flowing outwardly through the perforations that are beyond midpoint 240. This flow out of the casing causes a washing away of producing formation 230, particularly when the producing formation is formed of unconsolidated sand. The fluid flow continues outwardly through the perforations beyond midpoint 240 and back inwardly into the interior of the casing through the perforations above midpoint 240. The path of fluid flow is illustrated by the arrows. This washing action forms a cavity 242 in producing formation 230. Cavity 242 has beneficial effects with respect to improving the flow of hydrocarbon from formation 230 into the interior of the casing after the mechanism illustrated in FIG. 51 has been removed. Some of the advantages of cavity 242 are that the area of exposure of the producing formation to fluid flow into the casing is enlarged and the flow restrictions of perforation channels 234 are removed. Further, if gravel packing is required to hold an unconsolidated sand in place, the cavity provides a void space such that more gravel can be placed around the casing to improve the effectiveness of the gravel pack.

The provision of whirling mass 228 to set up vibrational energy substantially increases the rate of formation of cavity 242 in the arrangement illustrated. Vibration of the casing helps break down unconsolidated sand to speed the formation of cavity of 242.

The right-hand portion of FIG. 51 shows producing formation 240 with perforation channels 234 as they normally appear after they are formed by a perforating gun, whereas the left-hand side shows the results of the formation of cavity 242. In the left-hand side, cement positioned in annular 204 area exterior of casing 202 is shown as having been scoured away. This is primary for purposes of illustration to show the formation of the cavity. If the cement is highly consolidated it will not be normally as rapidly scoured away as will an unconsolidated producing formation and so, in some instances, the cement may remain in position with perforation channels 234 extending therethrough but such would not impair in any way the formation of cavity 242.

In the method illustrated in FIG. 51 the circulated fluid can be selected to dissolve scale or acid soluble materials or to dissolve or disperse hydrocarbon deposits located in the perforations, pore passageways near the well bore or inside the casing.

Figure 52A:
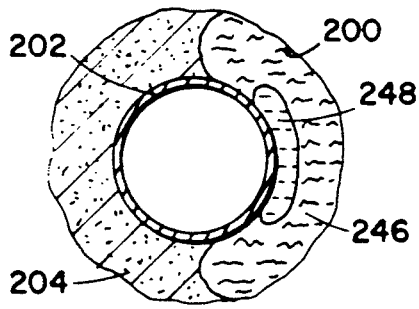
FIG. 52A is a cross-sectional view taken along the line 52A—52A of FIG. 52 showing the defective cement job and the resulting water flow channel.
Figure 52:
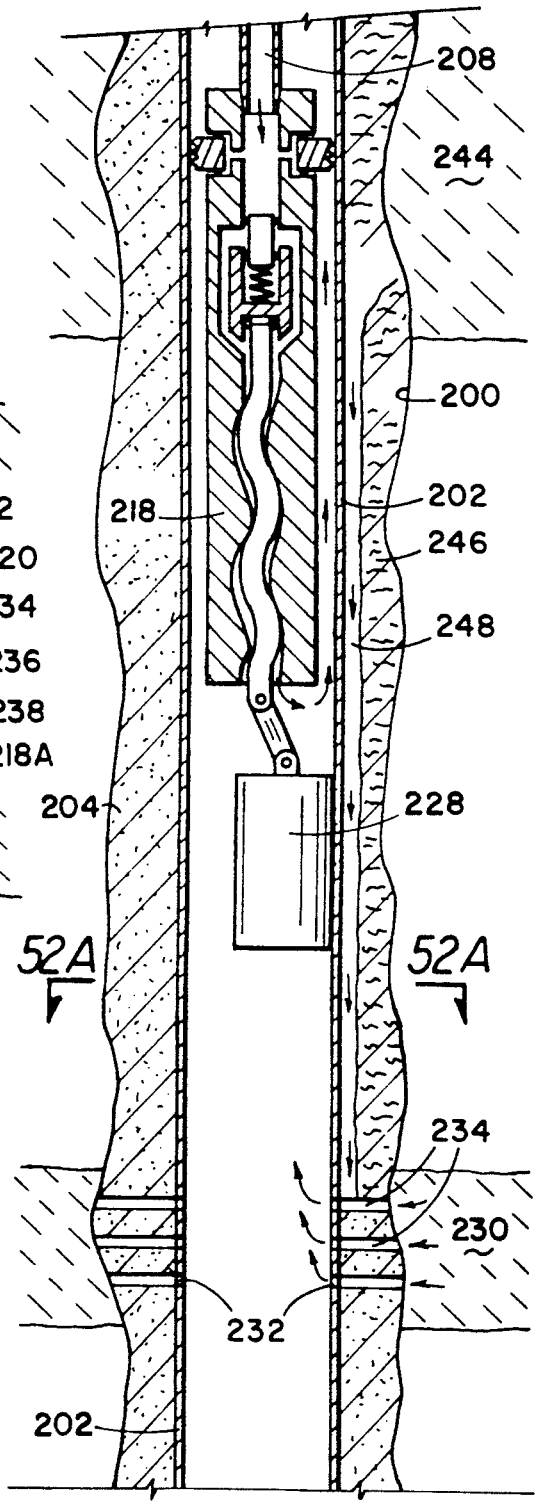
FIG. 52 shows the lower portion of a borehole extending through an upper permeable water producing formation and a lower permeable hydrocarbon producing formation and showing cement having been injected into and solidified in the annulus between the casing and the borehole with the intent of sealing off the water producing formation but in which a defect in the sealing action has occurred due to the inclusion of drilling mud therein, or for other reasons, providing a channel that permits water passing from the water producing formation into the perforations that communicate with the hydrocarbon producing formation and showing a method of positioning a backward whirling mass in the casing for use in augmenting a clean out operation prior to the initiation of a squeeze cementing or a remedial cementing job to repair the defective primary cement job.

FIG. 52 shows another method of using a backward whirling mass to improve the operation of hydrocarbon producing wells. Borehole 200 extends from the earth's surface and passes through a hydrocarbon producing formation 230, as has been previously described, with perforations 232 and perforation channels 234 communicating formation 230 with the interior of casing 202. In addition, FIG. 52 shows the borehole passing through an upper permeable formation containing water which will be termed a "water containing formation" 244, such water producing zone could also be below the producing formation. Cement is formed in annular area 204, and if the cement job has been successfully performed water from formation 244 would not be a problem since it would be sealed off from the producing formation 230. However, as shown in FIG. 52 and the cross-sectional view of FIG. 52A, a defect in the cementing operation shows that a quantity of gelled mud 246 has been entrapped in the cement 204 and therefore the cement job has not resulted in sealing off the flow of water. A water passageway 248, as seen in FIG. 52A, has been formed in gelled mud 246. As indicated by the arrows in FIG. 52, water flows from water producing formation 244 by way of passageway 248 and into communication with perforations channels 234 and perforations 232 to flow into the casing. This water must be removed along with any hydrocarbons produced from formation 230. If significant flow develops it may become uneconomical to pump large quantities of water to get a relatively small quantity of hydrocarbon production or the water may enter the hydrocarbon producing formation creating an undesirable situation. When this type of situations develops, as illustrated in FIGS. 52 and 52A, a corrective action which is known in the petroleum industry as a "squeeze cement job" must be undertaken. All pumping equipment and tubing and so forth are pulled from the casing and cement is forced back down through the casing in an effort to cement and close off water passageway 248. Since such action normally closes off perforations 232 and perforation channels 242, after a "squeeze cement job" a perforating gun may be required to reopen communication with production zone 230.

FIG. 52 shows a method of use of a backward whirling mass to help clean out the encapsulated mud 246 before a "squeeze cement job" is undertaken so that the chances of success are improved. For this action, a tubing 208 with fluid motor 218 is inserted into the casing with whirling mass 228 as previously described. The hydraulic motor is actuated by the passage of fluid downwardly through tubing 208 in the direction shown by the arrow with the fluid flowing back up internally of the casing. The fluid flow serves to rapidly rotate and backward whirl mass 228 to vibrate the casing in the area thereof in which capsulated mud 246 occurs. This vibration breaks the gel strength of the mud so that the water flowing from water containing formation 244 more rapidly washes all or at least a substantial portion of the encapsulated mud out of the borehole, the encapsulated mud being carried as a suspension through the perforations and into the interior of the casing where it is removed to the surface. In some situations it may be necessary to use a low density or aerated fluid to run the hydraulic motor such that the hydrostatic pressure inside the casing is less than the pressure in the formation thus encouraging the flow of formation fluid through channel 248. Again, motor 218 could be powered by electricity.

After the backward whirling mass has been used sufficiently to ensure that the encapsulated mud 246 has been at least substantially removed by washing action, the tubing with motor 218 and mass 228 are pulled from the well and then the well subjected to a corrective action, such as the heretofore referred to "squeeze cement job" by which cement is forced into the cavity left when gel mud 246 has been removed to thereby completely seal off the area surrounding the casing between hydrocarbon producing formation 230 and water producing formation 244.

The methods as illustrated in FIGS. 49 through 52 are illustrative of the various ways that high level vibrational energy achieved by a backward whirling mass in a casing positioned in a borehole can be used for enhancing the performance of an oil or gas well.

Figure 53:
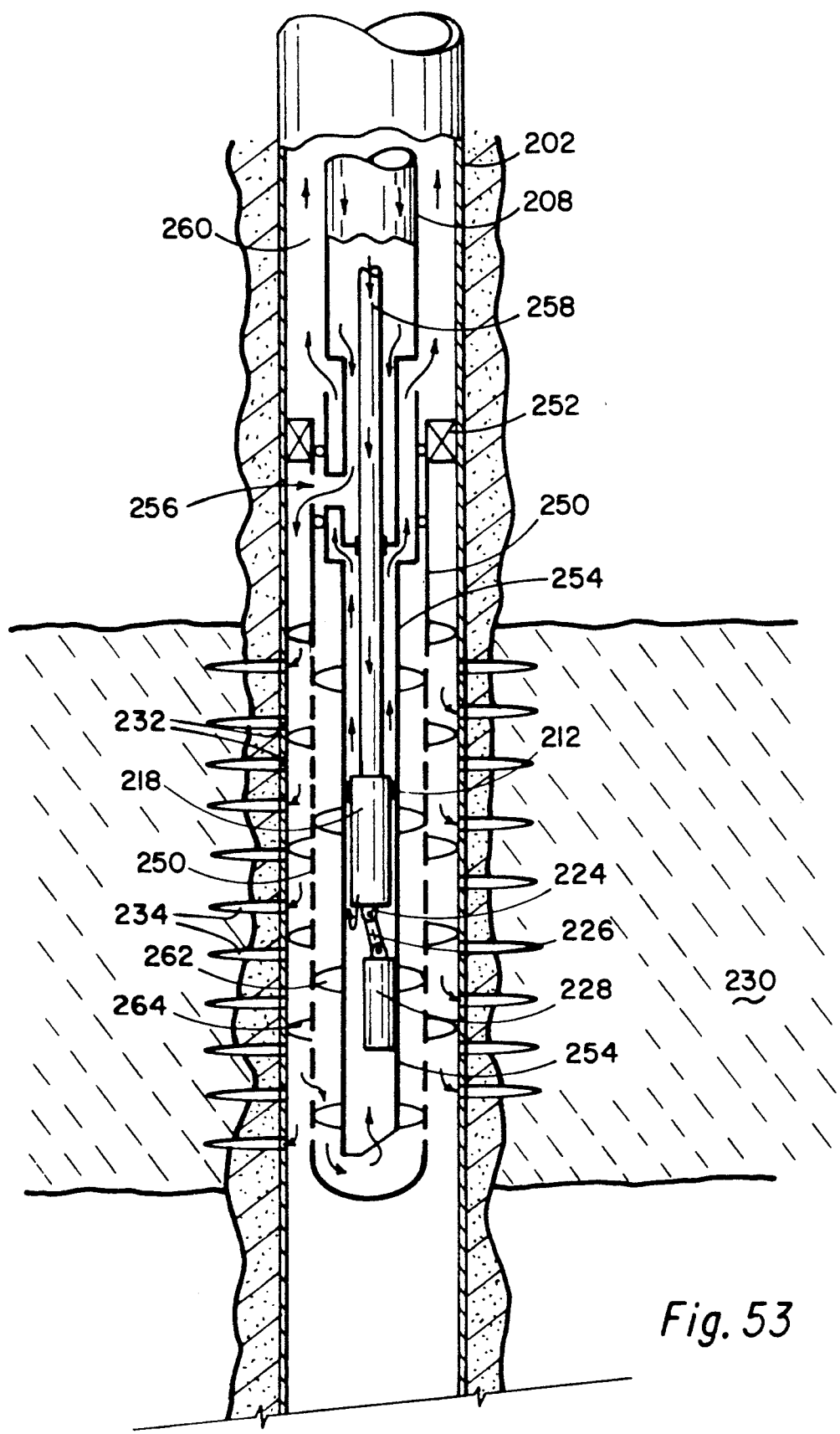
FIG. 53 is an elevational cross-sectional diagrammatic view of the lower portion of a borehole having a casing therein, the casing having been cemented in the borehole, and with perforations formed in the casing sidewall extending through the cement and into a producing formation and showing a gravel pack liner assembly positioned in the casing and a tubing within the casing having a gravel pack crossover tool therein positioned within the liner in the usual arrangement for injecting a gravel pack slurry into the producing formation for packing the perforations and showing a method of employing a backward whirling mass to vibrate the casing during the gravel packing operation to augment the disposition of gravel pack in the perforations.

FIG. 53 shows an additional method of the use of a backward whirling mass in an oil and/or gas well. This figure shows one method of using a backward whirling mass to augment the procedure known in the petroleum industry as "gravel packing". When the producing formation 230 is highly unconsolidated sand there is a tendency for fine sand to accumulate in perforations 232 and perforation channels 234. With sufficient accumulation over time the channels can become substantially blocked, closing off the flow of hydrocarbons from the producing formation into the interior of the casing. A typical solution to this problem is to "gravel pack" the perforations and perforation channels with larger diameter sand that freely permits the flow of fluid therethrough so as to prevent fine sand from entering these passageways.

Gravel packing liner assembly 250 is first positioned within the casing. The gravel pack liner assembly has a packoff 252. These are positioned in the well in the area of producing formation 230. The gravel pack liner provides a gravel pack screen within the casing. A wash pipe 254 of less external diameter than the internal diameter of the gravel pack liner is inserted within the liner, the wash pipe having a gravel pack crossover tool generally indicated by the numeral 256 attached to it. Tubing 208, as has been previously described, is positioned within casing 202 and extends to the earth's surface, the tubing being connected to the cross-over tool 256 which is, in turn, connected to wash pipe 254 extending within the gravel pack liner assembly 250. All of these elements are commonly used tools in the petroleum industry for practicing the technique of gravel packing. What is added to the usual technique as shown in FIG. 53 is the insertion of a small tubing 258 that extends from the earth's surface within tubing 208. Secured to the lower end of small tubing 258 is a fluid motor 218 as has been previously described, perhaps having anchors 212 as has been previously described, that are hydraulically actuated. Extending from motor 218 is drive shaft 224 connected to a flexible coupling 226 which is, in turn, connected to a rotational mass 228 all as previously described. The difference, however, in FIG. 53 is that the motor and rotational mass are supported inside of wash pipe 254 which is, in effect, an extension of tubing 208.

A gravel pack slurry is forced downwardly through tubing 208 in the annular area exterior of small tubing 258. The gravel pack slurry enters the crossover tool 256 and into the area within casing 204 exterior of gravel pack liner 250. This slurry enters into perforations 232 and perforation channels 234 to fill these areas with gravel. "Gravel" as used in this technique means sand that has an average diameter that is several times greater than the average diameter of the sand making up unconsolidated formation 230.

One of the problems in gravel packing is to ensure that the gravel slurry fully enters into the perforations and perforation channels and deposits the entrained gravel therein. Many times the gravel bridges off leaving undesirable void spaces. During the gravel packing action, fluid is forced from the earth's surface down through the small tubing 258 and through hydraulic motor 218 to rotate mass 228. The mass contacts the interior of wash pipe 254 and backward whirls in the manner as has been previously described. This backward whirling action vibrates the wash pipe and this vibration is transferred by fluid contained therein to casing 202. In addition, stabilizers 262 may be secured to wash pipe 254 to couple the vibrational energy to the gravel pack liner 250. The gravel pack liner, in addition, may be provided with stabilizers 264. Thus, vibrational energy is applied to the gravel pack slurry to more effectively cause it to penetrate perforation channels 234 and to pack therein.

FIG. 53 illustrates another way of using a backward whirling mass to improve operations within a well borehole, the improvement being attainable because of the relatively high vibrational energy that can be achieved by the use of a backward whirling mass. There are a number of other commercially available bottom hole assemblies for gravel packing in which the use of a backwards whirling vibrational energy source may be employed to improve results.

In FIGS. 49 through 53 hydraulic motors are employed as a means of rapidly rotating a mass about its axis of rotation to cause it to backward whirl to achieve a high level of vibrational energy. Instead of using a hydraulic motor, in each case the motor may be electrically driven suspended on a cable extending from the earth's surface with electrically actuated anchors such as described with reference to FIGS. 36 through 38. The electric motor could also be run in on tubing with the power cable contained within the tubing, with either the electric or hydraulic motor. The tubing could be conventional jointed tubing, or could be "coiled" or "reelable" tubing with no screwed connections. Coiled tubing would be desirable where speed in getting the vibrational device to the bottom of the well is important.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of obtaining information indicative of the earth's structure adjacent a borehole that has a generally cylindrical wall that extends from the earth's surface, comprising:
    positioning an instrument housing in the borehole, the instrument housing having an internal cylindrical surface;
    positioning a mass having a rotational axis in said instrument housing, the mass having an external surface of dimension less than the instrument housing internal cylindrical surface;
    rotating said mass about its rotational axis in a selected direction in said instrument housing and causing said surface of said mass to contact said internal cylindrical surface to thereby cause said mass to backward whirl in the direction opposite to said direction of rotation of said mass, centrifugal force of the backward whirling mass serving to generate vibrational energy that is radiated into the earth as a seismic signal;
    positioning at least one geophone in acoustical contact with the earth at a location remote from said rotating mass for receiving seismic signals resulting from vibrational energy generated by said backward whirling mass;
    collecting data generated by said at least one geophone; and
    processing the collected data to provide information indicative of the earth's structure adjacent the borehole.

2. A method according to claim 1 including;
    forming an offset borehole in the earth spaced from the first mentioned borehole and positioning at least one geophone in the offset borehole for receiving a seismic signal resulting from vibrational energy generated by said backward whirling mass.

3. A method according to claim 1 wherein said step of positioning at least one geophone in acoustical contact with the earth includes positioning said at least one geophone in contact with the earth's surface adjacent to the borehole.

4. A method according to claim 1 wherein said step of processing said collected data to provide information indicative of the earth's structure adjacent the borehole is carried out at a location remote from the borehole.

5. A method according to claim 1 including the step of:
    anchoring said instrument housing in at least the portion thereof having said rotating mass therein to the borehole cylindrical wall whereby vibrational energy generated by said backward whirling mass is more effectively coupled to the earth.

6. A method according to claim 5 wherein said step of anchoring said instrument housing to the borehole cylindrical wall includes means of releasably anchoring.

7. A method according to claim 1 including the step of acoustically coupling said instrument housing, at least in the portion thereof having said backwards whirling mass therein, to said borehole wall.

8. A method according to claim 1 wherein said at least one geophone is positioned within said borehole at a location spaced from said backwards whirling mass.

9. A method according to claim 1 including positioning a plurality of spaced apart geophones in said borehole and in acoustical contact with the earth, the geophones being spaced from said backwards whirling mass.

10. A method according to claim 8 including the step of placing acoustical decouplers within said instrument housing between said backwards whirling mass and said at least one geophone.

11. A method according to claim 1 including the step of positioning said instrument housing in the borehole by means of a cable extending from the earth's surface and connecting said cable to instrumentation at the earth's surface for collecting data generated by said at least one geophone.

12. A method according to claim 9 wherein the spacing between said backwards whirling mass and said plurality of spaced apart geophones is about 20 to 100 feet.

13. A method according to claim 9 wherein the spacing between said backwards whirling mass and said plurality of spaced apart geophones is about 1000 to 3000 feet.

14. A method according to claim 8 including the step of moving said instrument housing in said borehole in directions towards or away from the earth surface as said mass is rotated.

15. A method according to claim 1 wherein said backwards whirling mass and said at least one geophone are positioned and operated in a manner wherein the seismic signal received by said at least one geophone is at least in part formed by compressional waves, shear waves, Stoneley waves, or mixtures thereof.

* * * * *